US011907969B2

(12) United States Patent
Wolf, Jr.

(10) Patent No.: US 11,907,969 B2
(45) Date of Patent: Feb. 20, 2024

(54) PREDICTING OUTCOMES VIA MARKETING ASSET ANALYTICS

(71) Applicant: The Rocket Science Group LLC, Atlanta, GA (US)

(72) Inventor: John J. Wolf, Jr., Atlanta, GA (US)

(73) Assignee: The Rocket Science Group LLC, Atlanta, GA (US)

( * ) Notice: Subject to any disclaimer, the term of this patent is extended or adjusted under 35 U.S.C. 154(b) by 0 days.

(21) Appl. No.: 17/515,484

(22) Filed: Oct. 31, 2021

(65) Prior Publication Data

US 2022/0051287 A1 Feb. 17, 2022

Related U.S. Application Data

(63) Continuation of application No. 17/167,178, filed on Feb. 4, 2021, now Pat. No. 11,195,203.

(Continued)

(51) Int. Cl.
*G06Q 30/0242* (2023.01)
*G06Q 30/0204* (2023.01)
(Continued)

(52) U.S. Cl.
CPC ......... *G06Q 30/0244* (2013.01); *G06F 9/541* (2013.01); *G06N 5/027* (2013.01);
(Continued)

(58) Field of Classification Search
CPC ........... G06Q 30/0244; G06Q 30/0204; G06Q 50/01; G06N 20/00; G06N 5/027;
(Continued)

(56) References Cited

U.S. PATENT DOCUMENTS 7,460,496 B2 * 12/2008 Miloslavsky ....... H04M 3/5141
348/E7.083
8,407,073 B2 * 3/2013 Bagheri ......... G06Q 10/063112
705/7.14
(Continued)

FOREIGN PATENT DOCUMENTS

AU 2013204719 A1 * 11/2013
WO 2013192246 A2 12/2013

OTHER PUBLICATIONS

Nikhita Vedula, "Multimodal Content Analysis for Effective Advertisements on YouTube", 2374-8486/17 @ 2017 IEEE Doi 10.1109/ICDM.2017.149 (Year: 2017).*

(Continued)

*Primary Examiner* — Abdallah A El-Hage Hassan
(74) *Attorney, Agent, or Firm* — FERGUSON BRASWELL FRASER KUBASTA PC

(57) ABSTRACT

Systems and methods for predicting an outcome for a marketing asset. The systems and methods comprise first determining by a computing device, for a marketing asset received by the computing device, at least one asset type of the marketing asset. The marketing asset is parsed, by the computing device, into a plurality of segmented components, based on the determined at least one asset type. For at least one of the plurality of segmented components, at least one discrete marketing message conveyed by the marketing asset is determined, by applying at least one of a predictive model or rules to the at least one segmented component, where the at least one predictive model or rules are stored in a memory associated with the computing device. The method further includes determining, for each of the at least one discrete marketing message, at least one associated score. The method yet further includes inputting the determined at least one associated score to a trained predictive model to obtain a predicted marketing outcome, where the (Continued)

trained predictive model was trained using training scores associated with a multitude of training discrete marketing messages as independent variables and corresponding training marketing outcome data as dependent variables.

28 Claims, 18 Drawing Sheets

Related U.S. Application Data

(60) Provisional application No. 62/970,051, filed on Feb. 4, 2020, provisional application No. 62/970,036, filed on Feb. 4, 2020.

(51) Int. Cl.
| | |
|---|---|
| *G06Q 50/00* | (2012.01) |
| *G06N 20/00* | (2019.01) |
| *G06N 5/04* | (2023.01) |
| *G06F 9/54* | (2006.01) |
| *G06N 5/02* | (2023.01) |
| *G06F 40/205* | (2020.01) |
| *G10L 15/26* | (2006.01) |

(52) U.S. Cl.
CPC .............. *G06N 5/04* (2013.01); *G06N 20/00* (2019.01); *G06Q 30/0204* (2013.01); *G06Q 50/01* (2013.01); *G06F 40/205* (2020.01); *G10L 15/26* (2013.01)

(58) Field of Classification Search
CPC ......... G06N 5/04; G06F 9/541; G06F 40/205; G10L 15/26
USPC ...................................... 705/14.43
See application file for complete search history.

(56) References Cited

U.S. PATENT DOCUMENTS

| | | | | |
|---|---|---|---|---|
| 8,768,741 | B1* | 7/2014 | Hinton ............... | G06Q 10/0633 705/7.27 |
| 9,679,265 | B1* | 6/2017 | Schwartz ............ | G06Q 10/1093 |
| 10,621,530 | B2* | 4/2020 | Tran ........................ | G06F 16/21 |
| 2004/0088406 | A1* | 5/2004 | Corley ................. | H04L 41/147 709/224 |
| 2004/0100489 | A1* | 5/2004 | Berestov .............. | H04N 13/261 715/738 |
| 2007/0050175 | A1* | 3/2007 | Schmelzer ............ | G06F 16/958 702/186 |
| 2008/0126133 | A1* | 5/2008 | Park ....................... | G16H 10/60 705/3 |
| 2009/0006937 | A1* | 1/2009 | Knapp ............... | G06Q 30/0204 705/7.33 |
| 2011/0145032 | A1* | 6/2011 | Stearns ............ | G06Q 10/06315 705/7.13 |
| 2012/0173247 | A1* | 7/2012 | Sung ....................... | G10L 19/24 704/500 |
| 2012/0224680 | A1* | 9/2012 | Spottiswoode ..... | H04M 3/5232 379/265.11 |
| 2014/0279139 | A1* | 9/2014 | Jamzadeh .......... | G06Q 30/0601 705/26.1 |
| 2015/0264180 | A1* | 9/2015 | Wolthuis ............. | H04M 3/5232 379/265.12 |
| 2015/0371147 | A1* | 12/2015 | Wright ................... | G06N 20/00 706/12 |
| 2016/0117412 | A1* | 4/2016 | Mungi .................. | G06F 40/151 707/774 |
| 2016/0132903 | A1* | 5/2016 | Bansal ............... | G06Q 30/0201 705/7.29 |
| 2016/0364647 | A1* | 12/2016 | Achin .................... | G06N 20/00 |
| 2016/0371270 | A1* | 12/2016 | Crosby ............. | G06F 16/24578 |
| 2017/0024098 | A1* | 1/2017 | Doherty ................. | G11B 27/11 |
| 2017/0068735 | A1* | 3/2017 | Zhang .................. | G06F 16/951 |
| 2017/0308802 | A1 | 10/2017 | Ramsøy et al. | |
| 2017/0351873 | A1* | 12/2017 | Luff .......................... | G06F 9/54 |
| 2018/0005037 | A1* | 1/2018 | Smith, IV .............. | G06V 20/64 |
| 2018/0018580 | A1* | 1/2018 | Coppin ............... | G06F 16/9535 |
| 2018/0173713 | A1* | 6/2018 | Lawbaugh ............ | G06F 16/958 |
| 2018/0288226 | A1* | 10/2018 | Collins ............... | H04M 3/5232 |
| 2018/0349178 | A1* | 12/2018 | Painter .................. | G06F 9/5083 |
| 2019/0026786 | A1* | 1/2019 | Khoury ............. | G06Q 30/0271 |
| 2020/0219039 | A1* | 7/2020 | Vangell ..................... | G01S 1/68 |
| 2020/0267447 | A1* | 8/2020 | Ramachandra Iyer ..................... H04N 21/4542 | |
| 2020/0351241 | A1* | 11/2020 | Bajaj .................... | G06F 16/9535 |
| 2021/0064984 | A1* | 3/2021 | Wang ..................... | G06N 3/084 |

OTHER PUBLICATIONS

Malik Khizar Hayat, "Towards Deep Learning Prospects: Insights for Social Media Analytics", 2169-3536 2019 IEEE. (Year: 2019).*

Armstrong, Charles "Using Imagery of Property Improvements to Direct Marketing," http://www.tdcommons.org./dpubs_series/958, 2017.

Balanchine. "Challenges & Requirements for Building a Predictive Analysis Model." Cetrix Cloud Services. Jul. 22, 2018.

Goul, Michael "Predictive Analytics-Driven Campaign Management Support Systems," 2015 48th Hawaii International Conference on Systems Sciences, 2015.

PCT International Search Report to PCT/US2021/016539, dated Apr. 23, 2021.

Rubera et al. "Firm innovativeness and its performance outcomes: A meta-analytic review and theoretical Integration." Journal of Marketing 76 (3) (2012): 130-147.

Weber, "Data Science for Startups: Predictive Modeling." Medium. May 24, 2018.

Weller. "Marketing Asset Management: Turn Marketing Assets into Powerful Business Tools." Smartsheet. Nov. 26, 2019.

Wilson, Jobin "RealWorld Applications of Machine Learning Techniques over Large Mobile Subscriber Datasets," arXiv: 1502. 02215v1 [cs.LG] Feb. 8, 2015.

Written Opinion of the International Searching Authority for PCT/US2021/016539, dated Apr. 23, 2021.

* cited by examiner

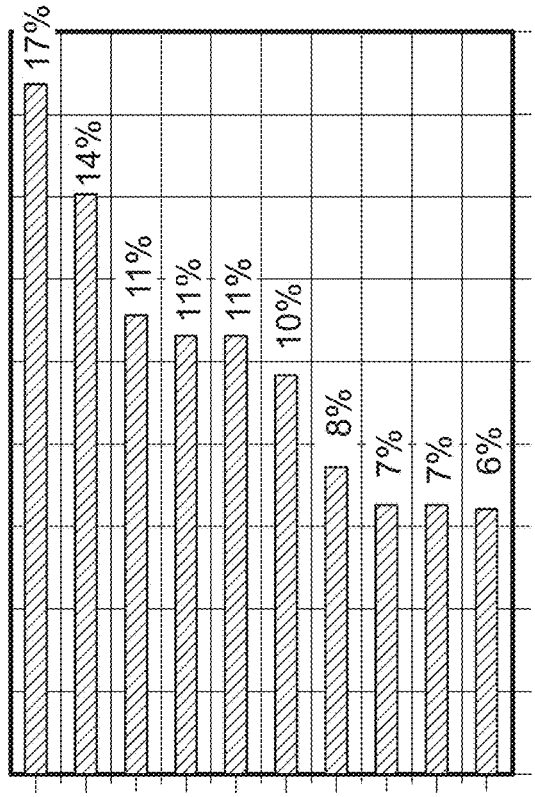
FIG. 6C
FIG. 6D

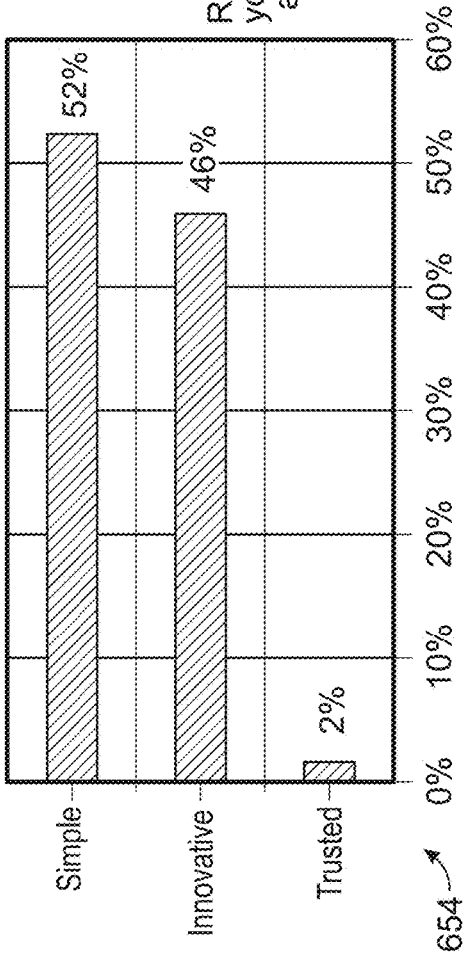
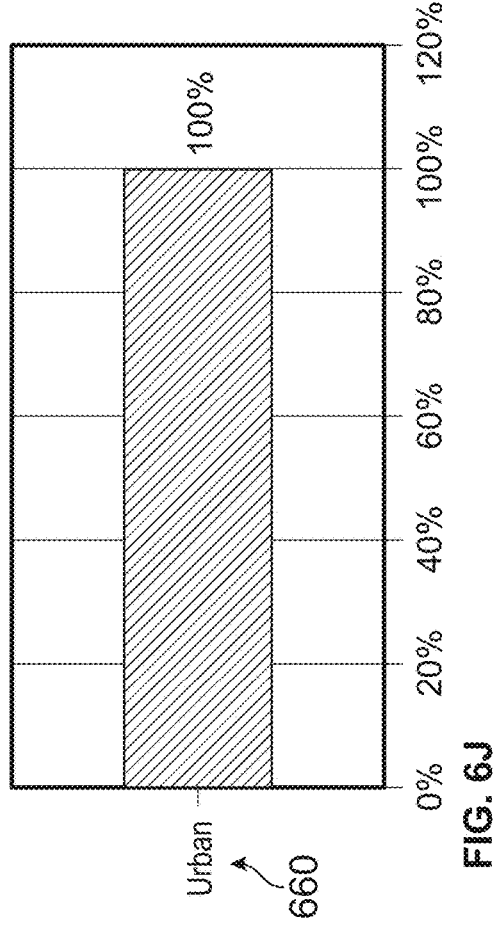

PREDICTING OUTCOMES VIA MARKETING ASSET ANALYTICS

RELATED APPLICATIONS

The present application is a continuation of U.S. Non-Provisional patent application Ser. No. 17/167,178, filed on Feb. 4, 2021, which claims priority to U.S. Provisional Patent Application Nos. 62/970,036 and 62/970,051, both filed on Feb. 4, 2020. The entirety of each of these applications is incorporated by reference herein.

BACKGROUND

Predicting an outcome of a marketing or sales campaign has typically involved at least some measure of human guesswork. Marketing and sales departments often rely on trial-and-error in their campaigns, in hopes of generating favorable outcomes for at least some fraction of the implemented campaigns. Such a haphazard approach is highly subjective and inefficient, frequently resulting in inefficiencies and higher costs. Moreover, implementing a campaign without a robust prediction of likely outcomes can result in the campaign being less effective than it might otherwise be. In some cases, a campaign might even do more harm than good, such as if certain demographics are offended by a campaign's content, for example.

It would be desirable, therefore, to make a data-driven prediction of a marketing or sales campaign's likely outcomes before implementation. Such a prediction could assist in improving efficiency and objectivity for the creative process underlying the design of the campaign.

SUMMARY

In a first example embodiment, a method for predicting an outcome for a marketing asset may include a computing device performing tasks. These tasks may include determining at least one asset type of a marketing asset received by the computing device. The marketing asset is parsed, by the computing device, into a plurality of segmented components, based on the determined at least one asset type. For at least one of the plurality of segmented components, the method includes determining at least one discrete marketing message conveyed by the marketing asset, by applying at least one of a predictive model or rules to the at least one segmented component, where the at least one predictive model or rules are stored in a memory associated with the computing device. The method further includes determining, for each of the at least one discrete marketing messages, at least one associated score. The at least one associated score is provided as input to a trained predictive model to obtain a predicted marketing outcome for the marketing asset.

In a second example embodiment, a system for predicting an outcome for a marketing asset may include at least one computing device configured to perform tasks. The tasks may include determining at least one asset type of a marketing asset received by the computing device. The marketing asset is parsed, by the computing device, into a plurality of segmented components, based on the determined at least one asset type. For at least one of the plurality of segmented components, the method determines at least one discrete marketing message conveyed by the marketing asset, by applying at least one of a predictive model or rules to the at least one segmented component, where the at least one predictive model or rules are stored in a memory associated with the computing device. The tasks further include determining, for each of the at least one discrete marketing messages, at least one associated score. Then, the at least one score is input to a trained predictive model to obtain a predicted marketing outcome.

In a third aspect, an article of manufacture for use in predicting an outcome for a marketing asset is provided. The article of manufacture includes a non-transitory computer-readable medium having stored program instructions that, upon execution by one or more processors, cause the one or more processors to perform tasks. The tasks may include determining at least one asset type of a marketing asset received by the computing device. The marketing asset is parsed, by the computing device, into a plurality of segmented components, based on the determined at least one asset type. For at least one of the plurality of segmented components, the method determines at least one discrete marketing message conveyed by the marketing asset, by applying at least one of a predictive model or rules to the at least one segmented component, where the at least one predictive model or rules are stored in a memory associated with the computing device. The tasks further include determining, for each of the at least one discrete marketing message, at least one associated score. Then, the at least one score is provided as an input to a trained predictive model to obtain a predicted marketing outcome.

Other aspects, embodiments, and implementations will become apparent to those of ordinary skill in the art by reading the following detailed description, with reference where appropriate to the accompanying drawings.

BRIEF DESCRIPTION OF THE FIGURES

The above, as well as additional, features will be better understood through the following illustrative and non-limiting detailed description of example embodiments, with reference to the appended drawings.

FIG. 6C is a pictorial screenshot diagram illustrating a tabular display of image objects and contents, according to an example embodiment.

FIG. 6D is a pictorial screenshot diagram illustrating a graphical display of product features, according to an example embodiment.

FIG. 6I is a pictorial screenshot diagram illustrating a graphical display of reputations, according to an example embodiment.

FIG. 6J is a pictorial screenshot diagram illustrating a graphical display of habitats, according to an example embodiment.

DETAILED DESCRIPTION

Figure 1:
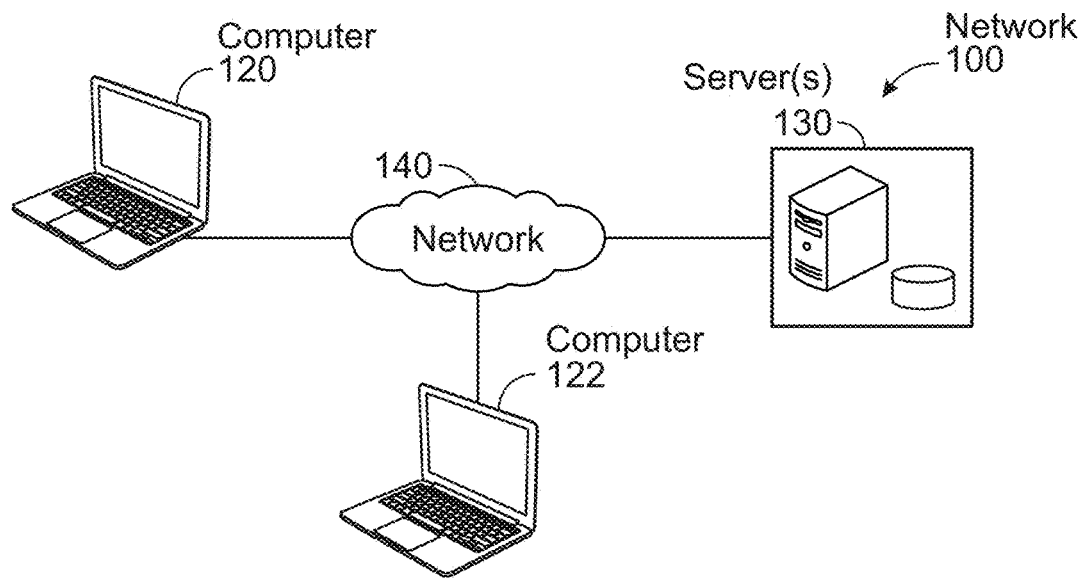
FIG. 1 is a schematic block diagram illustrating a marketing outcome prediction network, according to an example embodiment.

In the following detailed description, reference is made to the accompanying figures, which form a part of this description. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the presented subject matter. It will be readily understood that the aspects of the present disclosure, as generally described and illustrated in the figures, can be arranged, substituted, combined, separated, and designed in a wide variety of different configurations.

Overview

This description sets forth example techniques that relate to systems and methods for predicting outcomes of marketing assets (also referred to as "communications" herein) using analytics. Such analytics may include, but are not limited to, artificial-intelligence-based analytics. These techniques are designed to improve on the typical practice of using human guesswork or trial-and-error to assist in designing marketing or sales campaigns, resulting in potentially higher efficiency and effectiveness in obtaining desired marketing outcomes. The techniques set forth herein are data-driven and include parsing and categorizing, such as by using artificial intelligence, communication data items/components (e.g., text blocks, images, audio, and/or video) into higher-level marketing-based constructs. The marketing-based constructs, called "discrete marketing messages" herein, are then presented to one or more outcome prediction data models implemented as part of a machine learning system. Such a machine learning system can be hosted on a computing device or system configured to implement a variety of machine learning models in addition to the aforementioned outcome-prediction data model(s).

In some examples, the machine learning model may, but need not, include one or more neural networks or other models (e.g., support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithm) described in further detail below, to make predictions about marketing outcomes. Each model can be trained on a training dataset containing source marketing-based constructs (i.e., discrete marketing messages) having known marketing outcomes. These source marketing-based constructs each can be labeled according to a number of different types and/or levels of marketing outcomes. Newly received data items (e.g., text blocks, images, audio, and/or video) received in a marketing communication can be parsed into individual data items and placed or categorized into the marketing-based constructs, from which marketing outcome predictions can be made using one or more trained machine learning models.

Various example systems and methods disclosed herein advantageously utilize data analysis and manipulation (e.g., parsing) and/or artificial intelligence to analyze marketing content in order to improve efficiency and reduce subjectivity. Some example embodiments include analyzing discrete marketing messages, as well as contents, demographics, emotions, and/or colors of every image and video snippet, for example. This analysis can, in turn, improve marketing-outcome prediction accuracy. In addition, the methods and systems may link visual characteristics to marketing results, to allow for subsequent alterations to improve marketing performance (i.e., better realization of desired marketing outcomes).

In addition to predicting marketing outcomes through communication analytics, various example embodiments of the methods and systems may additionally include providing insights and/or recommendations for improving likelihoods of achieving desired marketing outcomes. For example, for the visual characteristics linked to marketing results described immediately above, the methods or systems could suggest alterations to visual characteristics, such as introducing additional or alternative colors, or modifying an image or video to display one or more persons matching a desired target persona, for example.

In some example implementations, the methods and systems may provide analysis and specific recommendations, so that future marketing communications can be drafted based on the recommendations. Additionally or alternatively, the methods and systems may further provide examples corresponding to the recommendations.

In some example implementations, the methods and systems couple text and visual analytics data with performance data to identify patterns that predict outcomes. The output may include predictions along with recommendations on how to improve performance.

Some example embodiments may also assist in improving consistency during the copy-drafting process. This is accomplished by the system analyzing the messaging and keyword density, for example, which helps to ensure that generated copy is predicted to be effective in producing desired marketing results. In some implementations, the system analyzes keywords that connect and guide customers to a particular product. By measuring which brand attributes both a company and/or its competitors are emphasizing and which ones a company is neglecting, the methods and systems can assist in promoting consistent usage of effective keywords.

To assist in identifying and maintaining brand standards, in some example implementations, the methods and systems monitor (e.g., through "following" and recording social media posts) marketing communications and document target markets, messaging, and visual identity. This allows the system to help ensure that new marketing assets adhere to the identified brand standards. For example, a particular system could store the following brand standard: "CompanyA has the best customer service. We are customer-obsessed. It's in our DNA to do whatever is needed to be successful." In addition, the system could compile, store, and present to a user, via a user interface, keywords and images associated with the identified brand standard. Example keywords include the following: "Customer success," "dedicated," and "customer experience." Example images might include images of happy employees and happy customers. Finally, some implementations could also provide a list of words and/or image contents to avoid.

In some further example implementations, the methods and systems compare marketing performance key metrics with those of industry peers and competitors. For example, a server can provide as output a listing of text brand scores showing company name, rank, and predicted engagement score for analyzed marketing content. The methods and systems can provide this output to assist the user in identifying ways to improve future marketing efforts.

In some example implementations, the system can also be used for direct analysis of a competitor's marketing and/or sales communications. According to one example, the system's analytics components analyze every text block and image, and determine target markets, positioning, messaging, tone, and voice. The system analyzes the contents, emotions, colors, and demographics within every image and illustration, for example.

The various example method and system implementations described above and as further detailed below utilize computing devices and analytics (e.g., artificial intelligence) to help solve technical problems relating to predicting marketing outcomes for proposed or actual sales or marketing communication assets. Some of the technical advantages afforded by these methods and systems include (1) improved prediction accuracy, (2) the ability to consider a larger pool of data (i.e., machine-learning training data) than is realistically feasible for human analysis of marketing communications, and (3) improved efficiency over past trial-and-error techniques, resulting in faster processing of proposed communications. Other technical advantages will become clear from the following description of the accompanying drawings.

I. Example Marketing Outcome Prediction System

FIG. 1 is a schematic block diagram illustrating a prediction network 100, according to one example implementation. Prediction network 100 includes computing devices 120, 122 (shown as laptop computers in FIG. 1) and one or more servers 130, connected via network 140. In some examples, prediction network 100 can have more, fewer, and/or different types of computing devices and/or servers than indicated in FIG. 1.

In example embodiments, some or all of computing devices 120, 122 and server(s) 130 can be connected to network 140 via one or more, possibly different, network protocols. Data can be transmitted between computing devices 120, 122 and server(s) 130 over wired and/or wireless links between computing devices, servers, and network 140. The format of each respective data transmission between devices in prediction network 100 can include one or more of a variety of different formats including: text formats, image formats, extensible mark-up language (XML), Simple Network Maintenance Protocol (SNMP) formats, database tables, a flat file format, or another format.

Computing devices 120, 122 can create, obtain, update, display, and/or delete data (and perhaps related software) for configurations of prediction network 100. Example data for configurations of prediction network 100 includes, but is not limited to: data for configuring devices in prediction network 100; data for configuring network protocols (e.g., File Transfer Protocol (FTP), HyperText Transfer Protocol (HTTP), Java Message Service (JMS), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions), and data for customizing, configuring, and managing applications on devices/servers of prediction network 100.

One or more servers 130 associated with one or more entities (e.g., enterprises) may store, update, delete, retrieve, and/or provide functionality for parsing data and/or learning patterns, trends, and/or features about data related to prediction network 100. Based on the learned patterns, trends, and/or features, server(s) 130 can generate outputs, such as predictions about marketing outcomes. The data stored on server(s) 130 may include data relating to analytics models (e.g., machine learning models), such as training data, for example. The data stored on server(s) 130 may also include device information and/or other information related to devices associated with the network 100. The stored data can be retrieved from server(s) 130 in response to a received query (or queries) requesting information about proposed or implemented marketing or sales campaigns, including predictions about marketing outcomes for such campaigns. In some embodiments, server(s) 130 can provide additional or alternative services as well, such as services related to tracking and storing brand standards.

Figure 2:
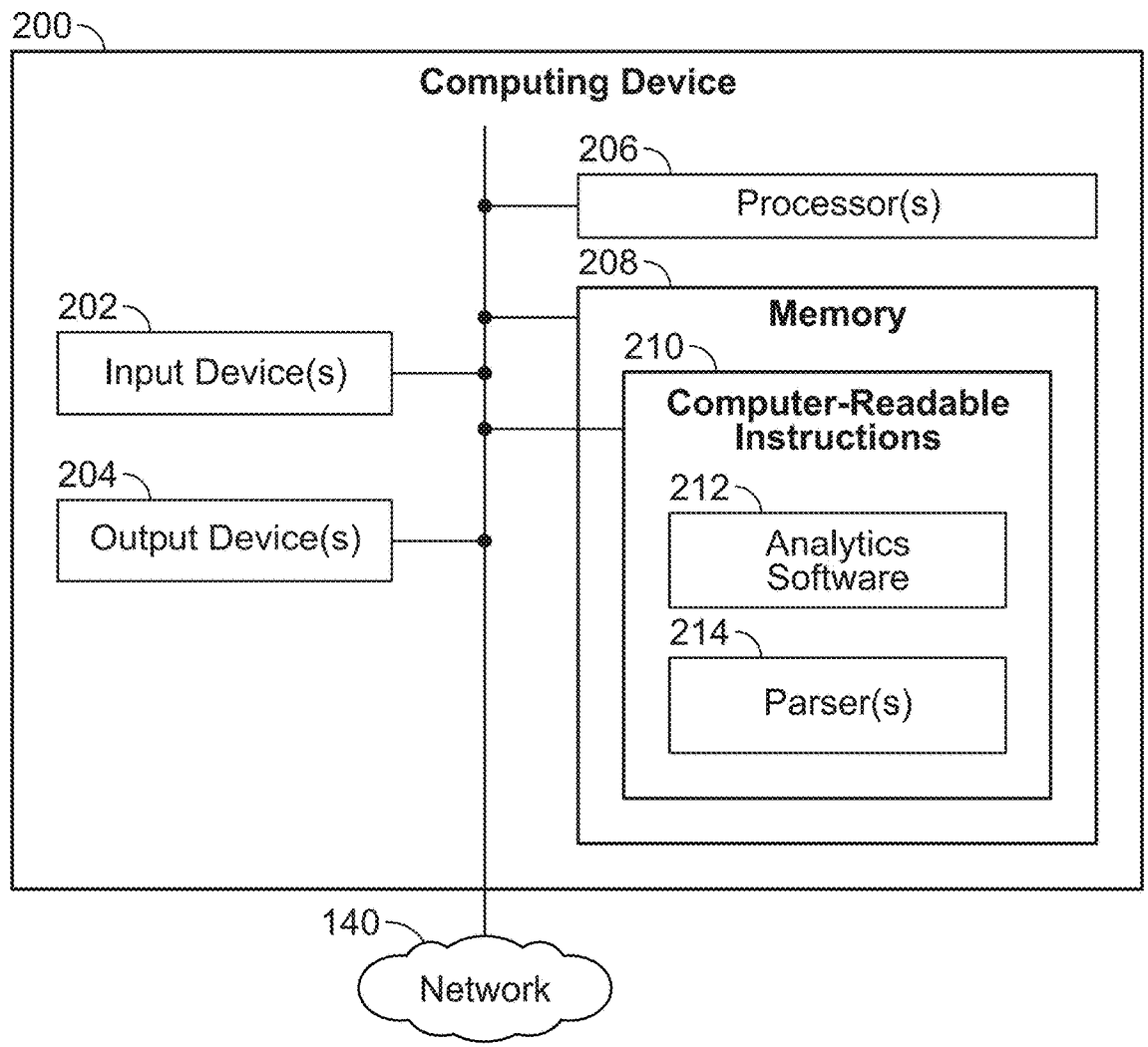
FIG. 2 is a schematic block diagram illustrating a computing device, according to an example embodiment.

FIG. 2 is a schematic block diagram illustrating a computing device 200, according to one example implementation. Computing device 200 may include one or more input devices 202, one or more output devices 204, one or more processors 206, and memory 208. In some embodiments, computing device 200 may be configured to perform one or more herein-described functions of and/or functions related to, for example, some or all of at least the functionality described in the context of an artificial neural network, a convolutional neural network, other analytics model, a computer, a personal computer, a smart phone, a smart watch, a wearable computer, a server device, a printing device, a display device, prediction network 100, pipelines 300, 400, and methods described herein.

Input devices 202 may include user input devices, network input devices, sensors, and/or other types of input devices. For example, input devices 202 may include user input devices such as a touch screen, a keyboard, a keypad, a computer mouse, a trackball, a joystick, a camera, a voice recognition module, and/or other similar devices. Network input devices may include wired network receivers and/or transceivers, such as an Ethernet transceiver, a Universal Serial Bus (USB) transceiver, or other similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver, and/or other similar types of wireless transceivers configurable to communicate via a wireless network, such as wireless portions of network 140. Other input devices 202 are possible as well.

Output devices 204 may include user display devices, audible output devices, network output devices, and/or other types of output devices. User display devices may include one or more printing components, liquid crystal displays (LCD), light emitting diodes (LEDs), lasers, displays using digital light processing (DLP) technology, cathode ray tubes (CRT), light bulbs, and/or other similar devices. Audible output devices may include a speaker, speaker jack, audio output port, audio output device, headphones, earphones, and/or other similar devices. Network output devices may include wired network transmitters and/or transceivers, such as an Ethernet transceiver, a USB transceiver, or other similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices may include, but are not limited to, vibration devices, haptic feedback devices, and non-visible light emission devices, such as devices that emit infra-red or ultra-violet light. Other output devices 204 are possible as well.

Processor(s) 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processor(s) 206 may be configured to execute computer-readable instructions 210 stored in memory 208 and/or other instructions as described herein.

Memory 208 may include one or more computer-readable storage media configured to store data and/or instructions that can be read and/or accessed by at least one of processor(s) 206. The one or more computer-readable storage media may include one or more volatile and/or non-volatile storage components, such as optical, magnetic, organic, or other memory or disc storage, which can be integrated in whole or in part with at least one of processor(s) 206. The computer-readable storage media may include one or more components that store data for short periods of time like register memories, processor caches, and/or random-access memories (RAM). The computer-readable storage media may include non-transitory computer readable media that stores program code and/or data for longer periods of time, such as secondary or persistent long-term storage; for example, read-only memory (ROM), optical or magnetic disks, or compact-disc read-only memory (CD-ROM). In some embodiments, memory 208 may be implemented using a single physical device (e.g., one optical, magnetic, organic, or other memory or disk storage unit), while in other embodiments, memory 208 may be implemented using two or more physical devices. In particular, memory 208 may store computer-readable instructions 210 that, when executed by processor(s) 206, may cause a computing device to perform functions, such as but not limited to, some or all of at least the herein-described functionality of devices, networks, methods, diagrams, images, equations, and/or scenarios.

In some embodiments, computer-readable instructions 210 may include at least analytics software 212. Analytics software 212 can include software and/or firmware for providing analytics functionality, making use of one or more supervised learning pipelines, such as one or more machine learning algorithms (MLA) and/or predictive models (trained MLA). This may include, for example, some or all of at least the functionality described in the context of an artificial neural network, a convolutional neural network, a computer, a personal computer, a smart phone, a smart watch, a wearable computer, a server device, a printing device, a display device, prediction network 100, pipelines 300, 400, and methods described herein. In some examples, analytics software 212 can be updated or otherwise reprogrammed, such as via connections with network 140, to provide different (e.g., improved or otherwise modified) functionality.

Computer-readable instructions 210 may also include a parser 214 operable to parse a received marketing communication/asset into one or more components. Parsing is described in additional detail with respect to FIG. 5, for example.

II. Example Machine Learning Systems

Figure 3:
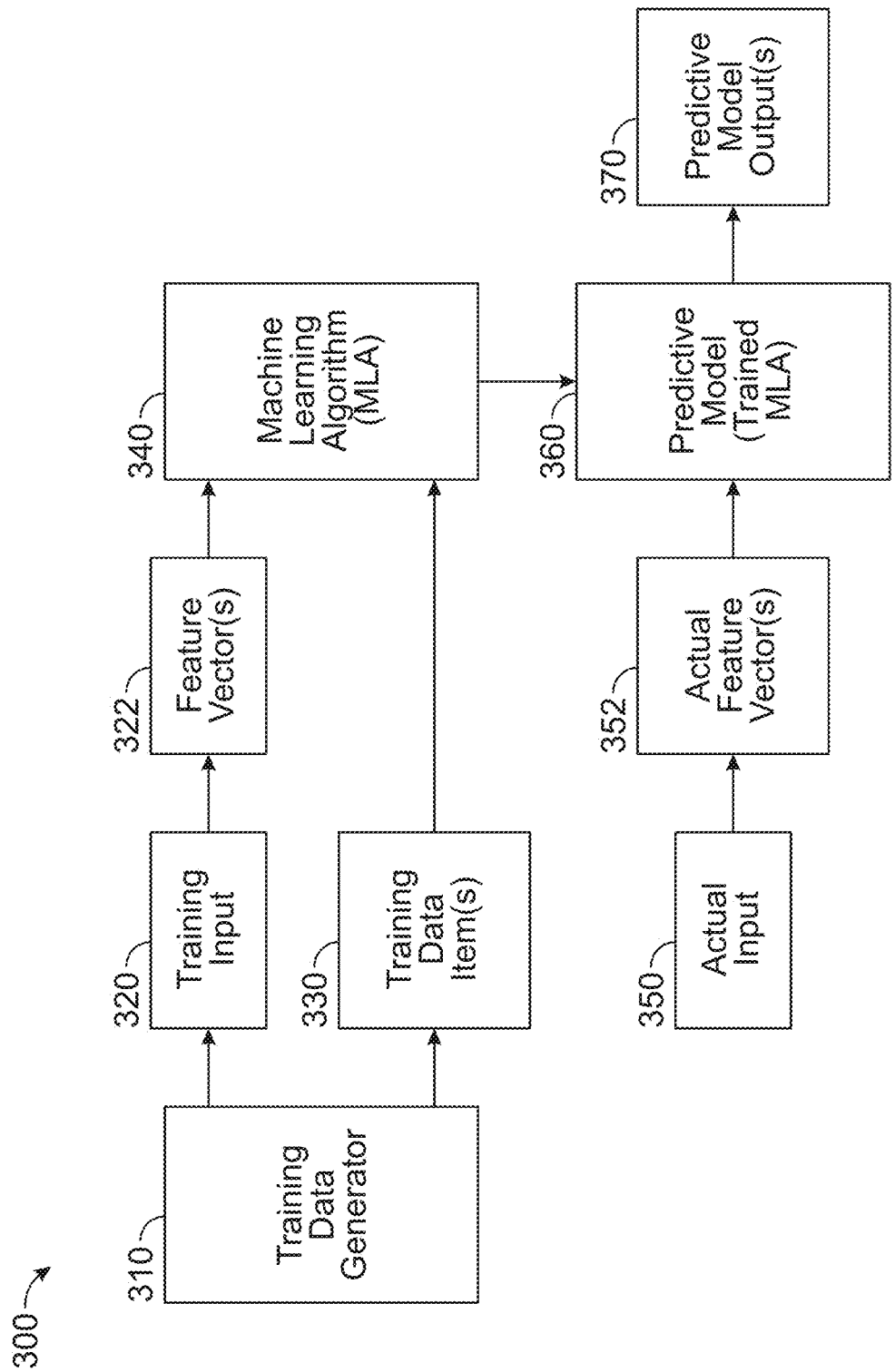
FIG. 3 is a schematic block diagram illustrating a supervised learning pipeline, according to an example embodiment.

FIG. 3 is a schematic block diagram illustrating a supervised learning pipeline 300, according to one example implementation. Supervised learning pipeline 300 includes training data generator 310, training input 320, one or more input feature vectors 322, one or more training data items 330, machine learning algorithm 340, actual input 350, one or more actual input feature vectors 352, predictive model 360, and one or more predictive model outputs 370. Part or all of supervised learning pipeline 300 may be implemented by executing software for part or all of supervised learning pipeline 300 on one or more processors and/or by using other circuitry, such as specialized hardware (e.g., an embedded AI processor) for carrying out part or all of supervised learning pipeline 300. The aforementioned processor(s), other circuitry, specialized hardware, and/or embedded AI processor may be situated in a computing device 200, such as a computing device 200 implementing some or all of the server(s) 130 and/or computers 120 and 122 shown in FIG. 1.

In operation, supervised learning pipeline 300 may involve two phases: a training phase and a prediction phase. The training phase may involve machine learning algorithm 340 learning one or more tasks. The prediction phase may involve predictive model 360, which may be a trained version of machine learning algorithm 340, making predictions to accomplish the one or more learned tasks. In some examples, machine learning algorithm 340 and/or predictive model 360 may include, but is not limited to, one or more artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithms. Other algorithms and/or models may additionally or alternatively be used.

During the training phase of supervised learning pipeline 300, training data generator 310 may generate training input 320 and training data item(s) 330. Training input 320 can be processed to determine input feature vector(s) 322. In some examples, training input 320 may be preprocessed, such as for image recognition tasks. In other examples, training input 320 may include one or more images. Specifically, training input 320 may include images that exhibit known customer responses (e.g., positive, negative, or neutral) associated with the image content. The training sets used in various embodiments set forth herein may include data, such as labeled training data, pertaining to hundreds of thousands of brands and millions of marketing assets, for example. As a result, even small businesses, or those with limited resources, may benefit from the technical improvements afforded by the technologies of the methods and systems set forth.

Input feature vector(s) 322 may be provided to machine learning algorithm 340 to learn one or more tasks. Input feature vector(s) 322 may represent features associated with training input 320.

Machine learning algorithm 340 may generate one or more outputs based on input feature vector(s) 322 and perhaps training input 320 related to the one or more tasks being learned. During training, training data item(s) 330 may be used to assess the output(s) of machine learning algorithm 340 for accuracy, and machine learning algorithm 340 may be updated based on this assessment. More particularly, the assessment may include use of a loss function that measures inconsistencies between predicted values and ground truth values (e.g., data labels from a training data item). For example, a loss function LF1 for training machine learning algorithm 340 may be based on a mean-square-error (MSE) value representing a "Euclidean distance" between the predicted value (LF1($O_x$)) and a data label of a training data item ($O_x$). The output of the loss function may be used during the training of machine learning algorithm 340 to decide how much to adjust parameters to reduce an error value (e.g., an error value calculated based on a difference between $O_x$ and LF1($O_x$), such as $|O_x-LF1(O_x)|$ (an L1 norm) or $|\{O_x-LF1(O_x)\}^2|^{1/2}$ (an L2 norm)). Other loss functions are possible as well. For example, the loss function may be based on cross-entropy loss and/or other values.

In a more specific example of training, training input 320 may be an image in a marketing communication, and training data item(s) 330 may include one or more labels that indicate aspects (e.g., typical specific customer reaction or feeling for a particular demographic) associated with the image. During training, machine learning algorithm 340 may make predictions about aspects associated with training input 320. Predictions may be compared to the label(s) of training data item(s) 330 to see if they match. For example, if machine learning algorithm 340 detects the same aspects as mentioned in a label for training data item(s) 330, then they match; otherwise, an error can be determined. A vector of errors may be calculated, corresponding to a magnitude of difference between the predicted aspects and the labels of training data items(s) 330. Then, a loss function may compare the vector of errors predicted by machine learning algorithm 340 with a corresponding vector constructed from the labels of aspects in training data item(s) 330. The comparison may be used to adjust parameters of machine learning algorithm 340 to reduce the overall error value.

Moreover, with respect to artificial neural networks (ANN), an ANN may have a number of nodes, each node having an associated numerical weight. These nodes may be arranged in the ANN into one or more layers (e.g., such as one or more CNN layers for each CNN model(s) 420 as described below). Training an ANN to perform a task may involve changing the weights of the nodes as training inputs related to the task are provided to and processed by the ANN. Once trained, the ANN (or model) may or may not modify the weights of the nodes upon being deployed for inference/detection/prediction tasks.

Training of machine learning algorithm 340 may continue until machine learning algorithm 340 is considered to be trained to perform the one or more tasks. For example, training of machine learning algorithm 340 may continue until the occurrence of one or more training termination criteria. The training termination criteria may include, but are not limited to, criteria where machine learning algorithm 340 (a) has made predictions for IN items of training input 320 (e.g., IN=1, 10, 100, 1000, 5000, 50000, 10000000, etc.), (b) has made predictions for each item of training input 320 a number IT times (e.g., IT=1, 2, 3, . . . ), or (c) has made predictions for a number N of items of validation input with an accuracy that exceeds a threshold accuracy value (e.g., For N=1, 10, 25, 50, 100, 1000, etc., a corresponding threshold accuracy of 50%, 90%, 95%, 99%, 99.9%, etc.). Other examples are also possible. Once trained, machine learning algorithm 340 may be considered to be a predictive model, such as predictive model 360.

During the prediction phase of supervised learning pipeline 300, actual input 350 can be processed to generate actual input feature vector(s) 352. Predictive model 360 can perform predictions, such as image recognition tasks, by taking actual input feature vector(s) 352 as inputs.

In example embodiments, predictive model 360 may generate one or more predictions about actual input feature vector(s) 352 as part or all of predictive model output(s) 370. For instance, predictive model 360 may receive a request to make a prediction about actual feature input vector(s) 352, responsively generate one or more predictions about actual input feature vector(s) 352, and provide the prediction(s) as predictive model output(s) 370. The prediction phase/use of predictive model 360 is discussed in more detail below.

In some examples, machine learning algorithm 340 may be trained on one or more training computing devices and predictive model 360 may be executed on the same training computing device(s). In other examples, machine learning algorithm 340 may be trained on the training computing device(s). Then, after training, now-trained machine learning algorithm 340 may be communicated as predictive model 360 from the training computing device(s) to one or more other computing devices that can execute predictive model 360 to generate predictive model output(s) 370.

Figure 4:
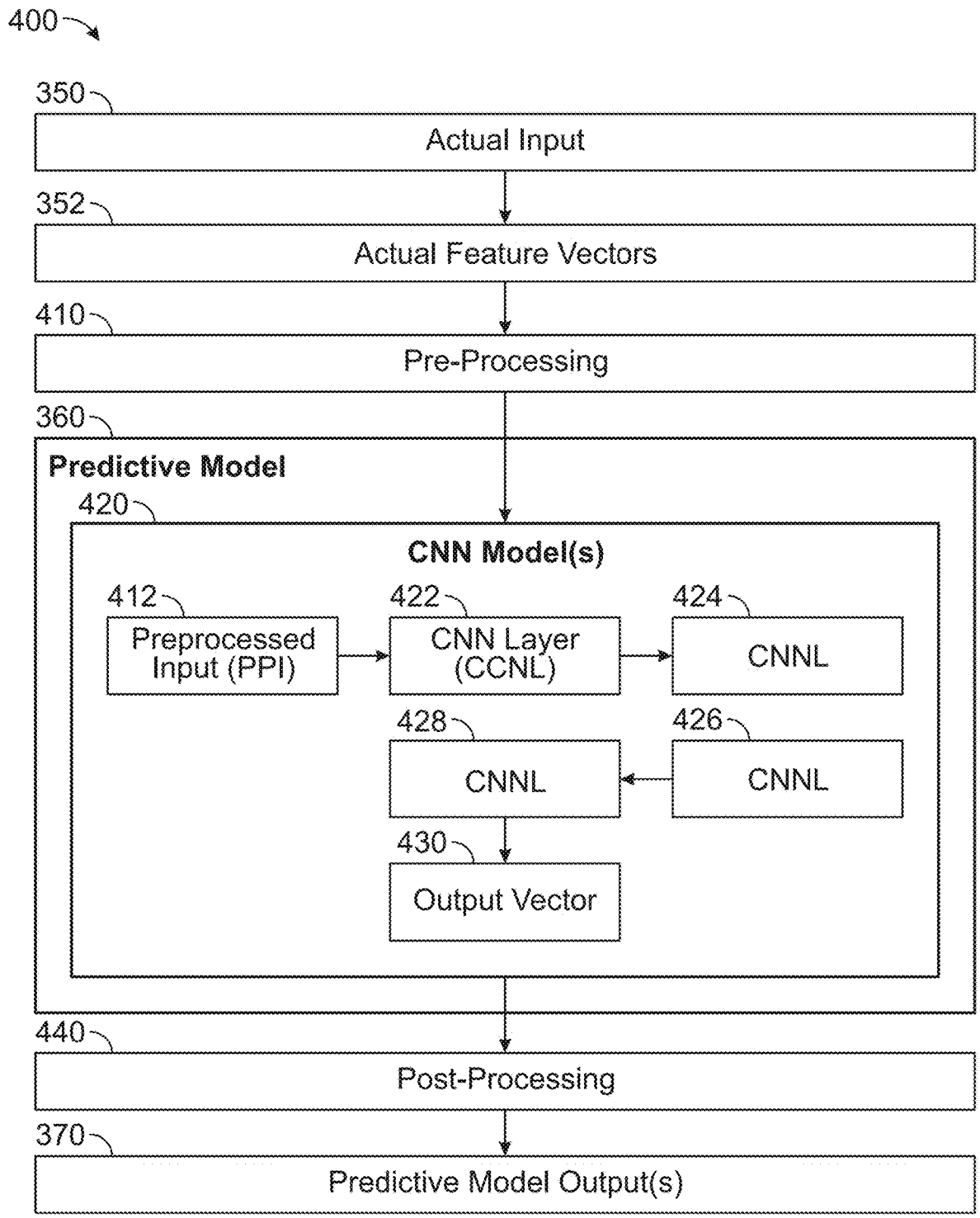
FIG. 4 is a schematic block diagram illustrating a machine learning pipeline, according to an example embodiment.

FIG. 4 is a schematic block diagram illustrating a machine learning pipeline 400, according to one example implementation. In some examples, ML pipeline 400 may be related to and/or implement the prediction phase of supervised learning pipeline 300. ML pipeline 400 includes actual input 350, actual feature input vector(s) 352, preprocessing 410, predictive model 360, post-processing 440, and predictive model output(s) 370. Part or all of ML pipeline 400 may be implemented by executing software on one or more processing devices and/or by using other circuitry (e.g., specialized hardware for carrying out part or all of ML pipeline 400).

In operation, ML pipeline 400 may begin by receiving actual input 350. In particular, actual input 350 to ML pipeline 400 may include one or more actual electronic images. After receiving actual input 350, ML pipeline 400 may generate actual input feature vector(s) 352 based on actual input 350. Actual feature vector(s) 352 may represent features of actual input 350. The feature(s) may include, but are not limited to color values, size, and others.

After generating actual input feature vector(s) 352, ML pipeline 400 may proceed to pre-processing 410. During pre-processing 410, actual input feature vector(s) 352 may be pre-processed to increase the accuracy of predictive model 360. For example, pre-processing 410 might include normalization and mean-subtraction for rescaling numeric attributes into a more compact range principal component analysis (PCA) to reduce the dimensionality. As another example, pre-processing 410 might include whitening transformations to reduce underlying noise in input data.

After pre-processing 410, ML pipeline 400 may proceed to use predictive model 360 to make predictions regarding pre-processed actual input feature vector(s) 352. FIG. 4 shows an example in which predictive model 360 of ML pipeline 400 includes CNN model(s) 420. When predictive model 360 receives pre-processed actual input feature vector(s) 352 from pre-processing 410, predictive model 360 may utilize CNN model(s) 420 to classify (or otherwise characterize) pre-processed actual input feature vector(s) 352. The input (i.e., pre-processed actual input feature vector(s) 352) into CNN model(s) 420 may be referred to herein as pre-processed input 412.

CNN model(s) 420 may include, for example, one or more trained convolutional neural networks that perform classification on pre-processed input 412. In particular, each CNN model in CNN model(s) 420 may contain one or more CNN layers. A CNN layer may perform convolution, activation, pooling, or inference tasks using respective one or more convolution layers, one or more activation layers, one or more pooling layers, and/or one or more fully-connected layers. Convolution layers may include one or more filters to filter respective inputs. Each filter may work over a subset of an input.

The output of the convolution layer (i.e., activation map) may be provided as an input to an activation layer. Activation layers determine whether the activation map is to be provided to a subsequent layer. For example, suppose the activation map has values in the range [0, 1] and that only activation map values above 0.4 are to be provided to a subsequent layer. Then, the activation layer could map activation map values in the range [0, 0.4] to 0 (representing no activation), and map activation map values in the range (0.4, 1] to 1 (representing activation). More generally, an activation layer can model an activation function, such as a sigmoid/logistic activation function, a hyperbolic tangent activation function, a rectified linear unit (ReLU) activation function, or another activation function, to determine whether the output of the convolution layer (e.g., the activation map) is to be provided to a subsequent layer. Pooling layers down-sample input provided by convolution and activation layers.

Fully-connected layers can have full connections to all activations in a previous layer and may act as a soft-max classifier. That is, the fully-connected layer can receive an input from a previous layer and can output a resulting N dimensional vector, where N is the number of possible predictions that could be made about actual input 350. For example, if actual input 350 was an image of a digit and if predictive model 360 was trained to classify digits within images, N would be 10.

Each output number in the resulting N dimensional vector may represent the probability of a certain class (i.e., possible prediction) occurring in actual input 350. For example, continuing from the example digit classifier, a resulting vector could appear as [0 0.1 0.1 0.75 0 0 0 0 0 0.05], where the probability that actual input 350 contains the digit 1 is 10%, the probability that actual input 350 contains the 2 is 10%, and so on. This resulting vector may be outputted by CNN model(s) 420, for example, as output vector 430. In practice, CNN model(s) 420 can include CNNs with different combinations (also known as CNN architectures) of convolutional layers, activation layers, pooling layers, and fully-connected layers.

As a conceptual illustration of CNN layers and their operations, CNN layers 422, 424, 426, and 428 are provided in FIG. 4. CNN layers 422, 424, 426 can selectively filter and down-sample input using convolution, activation, and pooling layers to extract features, while CNN layer 428 can provide a final output prediction about actual input 350. In an example operation, preprocessed input 412 may be provided to CNN layer 422. Then, CNN layer 422 may process preprocessed input 412 (e.g., convolve, activate, and/or pool preprocessed input 412 into a first feature vector) and provide input (e.g., the first feature vector) to CNN layer 424. CNN layer 424 may process the input provided by CNN layer 422 (e.g., convolve, activate, and/or pool input provided by CNN layer 424 into a second feature vector) and provide input (e.g., the second feature vector) to CNN layer 426. CNN layer 426 may process the input provided by CNN layer 424 (e.g., convolve, activate, and/or pool input provided by CNN layer 424 into a third feature vector) and provide input (e.g., the third feature vector) to CNN layer 428. CNN layer 428 may process the input provided by CNN layer 426 (e.g., make a soft-max prediction on input provided by CNN layer 426 into a fourth feature vector) and provide output vector 430 (e.g., the fourth feature vector) as the output prediction of predictive model 360. After predictive model 360 has made a prediction (i.e., output vector 430) regarding actual input 350, ML pipeline 400 may proceed to perform post-processing 440 of output vector 430. It should be noted that CNN layers 422, 424, 426, and 428 are solely a convenient conceptual representation of a CNN architecture and not intended to be limiting with respect to example embodiments or techniques described herein. For example, CNN model(s) 420 may have more, fewer, and/or different layers than CNN layers 422, 424, 426, and 428. Moreover, predictive model 360 may utilize other models besides CNN models.

In some examples, post-processing 440 may include weighting methods that combine multiple predictions into a single, aggregate prediction. For instance, output vector 430 may represent one out of a myriad of predictions made by predictive model 360 with regards to actual input 350. As a specific example, if actual input 350 is an image, multiple sections of the image (e.g., 4 sections) may each be provided to predictive model 360. As such, output vector 430 may represent one out of a total of four predictions made by predictive model 360 with regard to actual input 350. Then, weighting methods may be used to combine each of the four predictions into a single, aggregate prediction. Weighting methods may be determined as a sum, or other numerical combination (e.g., an average, a weighted average, a product) of the individual output vectors.

In some examples, post-processing 440 may include ranking methods that curtail output vector 430 to only "relevant" classes. Continuing again from the digit classifier example, suppose that output vector 430 from predictive model 360 is [0 0.1 0.1 0.75 0 0 0 0 0 0.05]. In such a scenario, post-processing 440 may rank the top N classes as "relevant" and only retain classes with predicted probabilities that fall into the top N. For instance, if N=3, ranking methods may retain digit 3 (75% predicted probability), digit 2 (10% predicted probability), and digit 1 (10% predicted probability). In another example, post-processing 440 may retain any class with a prediction value exceeding a predefined threshold (e.g., 60% or 80%). Many other examples of ranking methods are also possible. In line with the discussion above, ranking methods may also be applied to single, aggregate vectors determined by weighting methods.

After post-processing 440 of the output(s) of predictive model 360 is complete, ML pipeline 400 may proceed to provide predictive model output(s) 370. ML pipeline 400 may provide predictive model output(s) 370 by storing some or all of predictive model output(s) 370, communicating some or all of predictive model output(s) 370 to one or more other computing devices, displaying some or all of predictive model output(s) 370, and/or otherwise furnishing some or all of predictive model output(s) 370 as outputs.

In some examples, specific hardware and/or software may be designed to embody part or all of predictive model 360 and/or ML pipeline 400. For example, the specific hardware representing predictive model 360 and/or ML pipeline 400 may be embodied as analytics software 212 executed by processor(s) 206.

III. Example Systems and Methods

Figure 5:
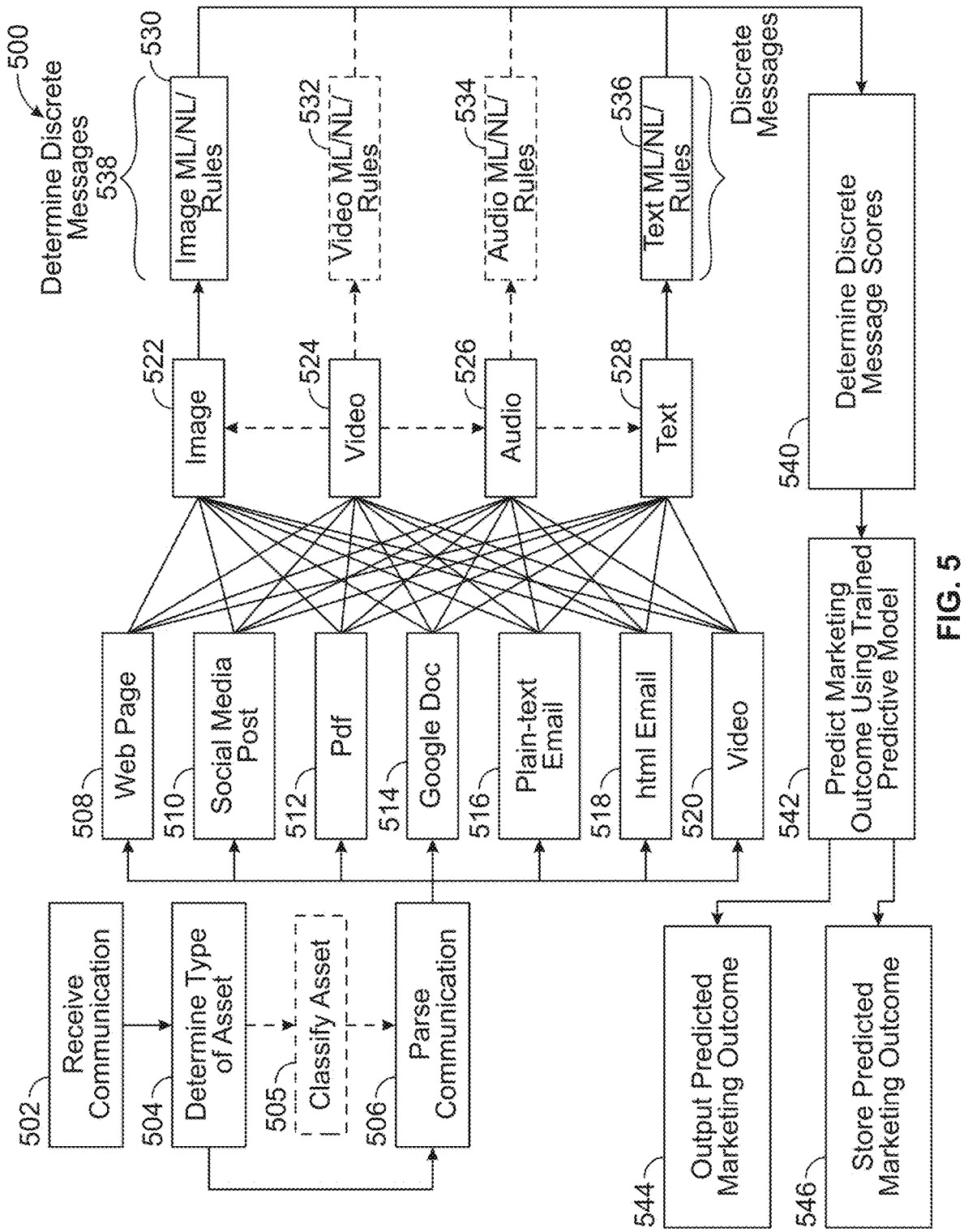
FIG. 5 is a schematic block/flow diagram illustrating a system and method of predicting outcomes via marketing asset analytics, according to an example embodiment.

FIG. 5 is a schematic block/flow diagram illustrating a method 500 of predicting marketing outcomes for a marketing and/or sales communication, according to an example implementation. Method 500 may represent a specific sequence or series of actions that, when performed, allows a computing device to predict outcomes for marketing communications. Method 500 can be carried out by a computing device, such as computing device 200. Moreover, additional components, steps, or blocks, may be added to method 500 without departing from the scope of the method.

The method 500 includes receiving a communication (block 502), such as through the input device 202. Examples of communications could be proposed or implemented marketing and/or sales communications (also referred to as "assets" herein), in the form of data or other information representing or embodying such communications. The received communication may be associated with the user (e.g., an individual or enterprise) of the method 500, or instead may be associated with a competitor of the user. The communication may be targeted toward an individual (e.g., a "form" email customized for a particular individual), a group of individuals (e.g., a customer newsletter or blog post), or the general public (e.g., a scanned print advertisement or web ad).

The method 500 further includes determining a type of asset (block 504) encompassed by the received communication. For example, the communication could be determined to be an asset of one of the following types: a web page 508, a social media post 510, a pdf 512, an electronic document (e.g., google doc 514, MS-Word doc, etc.), a plain-text email 516, an html email 518, a video 520, a sales call (e.g., a call script or transcript of a recorded call), a digitization of a traditional print communication, or some other marketing or sales asset. Determining the type of asset could include examining at least a portion (e.g., an initial portion, such as a header or remarks section) of a data file associated with the particular received communication. Alternatively, determining the type of asset could include examining the entire communication.

In some example implementations, blocks 502 and 504 may be swapped, such that a type of marketing asset/communication is first determined or decided, followed by actually receiving marketing assets/communications of that type. For example, web communications may be received from a collection service that "crawls" websites, scraping data for use in the outcome prediction methods set forth herein. In such a case, it is first decided that web communications are going to be examined, and then, the communications (e.g., web pages) are received via a robotic web crawler.

Moreover, the method 500 could additionally or alternatively include classifying the communication by one or more attributes (block 505), such as marketing objective or intended outcome (e.g., to initiate a sale, to notify and/or inform, or to build a relationship). For example, the following are specific examples of classification attributes that could be assigned to a particular marketing or sales communication: business vertical (e.g., home services, electronic retail, soft drinks), brand archetype (e.g., explorer, lover, jester), customer type (e.g., business, consumer), supply chain role (e.g., maker, distributor, retailer), etc. Such a classification could be assigned by a creator of the communication, for example. For instance, during a sign-up or registration process, the communication creator could supply information via a web form to create a digital "brand book" that indicates potential classification attributes, such as industry or other attributes listed immediately above. Alternatively, the system 500 could apply a classification model to the received communication to determine a suitable classification attribute. As yet another alternative, a user associated with the system 500 (where the user is unaffiliated with the communication creator) could apply a classification. While block 505 is illustrated as an optional function to be performed after the function after block 504, the function of block 505 could alternatively be moved to other locations in the method (e.g., immediately after block 502 or elsewhere) or omitted entirely. The function of classifying the communication by one or more attributes shown in block 505 may assist with predicting the marketing outcome, such as by informing as to suitable or preferred machine learning models (or sequences of models) and/or by defining a particular industry, vertical, or other group to which the received communication should be evaluated and/or compared against.

The method 500 yet further includes parsing the communication (block 506) into one or more blocks (e.g., blocks 508-520, as described above), based on the determined type of asset. For example, based on the determined type of asset, the communication could be parsed into one or more of the following: image(s) 522, video(s) 524, audio 526, and/or text 528. This parsing could include utilizing one or more of the following to parse the communication into blocks: html tags, Application Program Interfaces (APIs), image recognition, and/or speech transcription, for example.

More particularly, and by way of example only, if the asset (communication) is a web page, then the method 500 could include robotically crawling the web page, identifying and storing html code, and parsing the stored html code by identifying html tags. For example, each html tag could identify at least one image, headline text, sub-headline text, paragraph text, and/or video.

If the asset is a social media post, then the method 500 could include using an API of the respective social media app to identify segmented components, such as image, text, and/or video components. Alternatively, if the asset is a social media post on a social media website, then the method could include crawling the web page, identifying and storing html code, and parsing the stored html code by identifying html tags, where the html tags identify an image, headline text, sub-headline text, paragraph text, and/or video, for example.

If the asset is a pdf, then the method 500 could include using a pdf parser to identify segmented components, such as image, text, or video components.

If the asset is a google doc (or other similar file created with a web-based application), then the method 500 could include using an API associated with the web-based application (e.g., a google doc app) to identify segmented components, such as image, text, or video.

If the asset is a plain-text email, then the method 500 could include parsing the text block of the email.

If the asset is an html email, then the method 500 could include parsing the html email by identifying html tags associated with at least one image, headline text, sub-headline text, paragraph text, and/or video.

If the asset is a video, then the method 500 could include segmenting the video into temporal blocks, parsing the audio and images from each block, and transcribing the audio into text, such as by using an online or local automated audio transcription service. One suitable audio transcription service is Amazon's audio transcription service, available at https://aws.amazon.com/transcribe/. The parsed video could be further parsed into a series of images (e.g., all images in the parsed video or a subset of images in the parsed video), to which image recognition software (e.g., using predictive classification models similar to those described herein) could be applied to identify one or more objects, scenes, or other items present in the parsed video.

Similarly, if the asset is an audio sales call, then the method 500 could include segmenting the call audio into temporal blocks, parsing the segmented audio from each block, and transcribing the parsed audio into text.

If the asset is an asset other than one listed above, then the method 500 could identify segmented components using an API for an application associated with that asset. Other parsing methods could additionally or alternatively be used, depending on the type of asset.

After parsing the communication into one or more blocks, based on type of asset, the method 500 includes determining one or more discrete marketing messages 538 being communicated, by analyzing each segmented component from the parsed asset. As shown in FIG. 5, this analysis could include providing the parsed components to systems 530, 532, 534, and/or 536. Systems 530, 532, 534, and/or 536, described in further detail below, could each include one or a plurality of machine learning models, applied either in series or parallel (or both). Alternatively, the systems 530, 532, 534, and/or 536 could include one or a plurality of natural language models, applied either in series or parallel (or both). As yet another alternative, the systems 530, 532, 534, and/or 536 could include at least one machine learning model and at least one natural language model. As still yet another alternative, the systems 530, 532, 534, and/or 536 could subject the asset components to one or more rules, as described in further detail below.

Video ML/NL system 532 and Audio ML/NL system 534 are illustrated with hashed lines to indicate that video and audio may be first converted to image and/or text, respectively (such as through transcription or video segmenting). As such, the systems 530, 532, 534, and/or 536 need not include a model for each of the image, video, audio, and text types. Moreover, for some assets being analyzed, systems 530, 532, 534, and/or 536 might not identify any discrete messages in the asset being analyzed.

The machine learning and/or natural language processing systems 530, 532, 534, 536 will now be described in further detail, with reference to the following examples.

In a first example, a machine-learning system, such as one utilizing the pipelines 300 and/or 400 illustrated in FIGS. 3 and 4 could be used to identify, e.g., at a sentence level, when certain discrete marketing messages are being conveyed. Training such a machine-learning system may include providing a large set of training data in which particular sentences, fragments, phrases, and/or words are associated with particular discrete marketing messages. In such an embodiment, a training dataset large enough to achieve an acceptable accuracy in the predictive model is recommended. Such a training dataset (e.g., the "Corpa" training dataset) will typically, but need not, include thousands of text blocks, e.g., from many companies and/or many industries. As another example, a crowdsourcing website, such as the Amazon Mechanical Turk crowdsourcing site (available at https://www.mturk.com/), could be used to compile training data. In this scenario, the method 500 may include transmitting data representing a multitude of sentences (or other word groupings) to the crowdsourcing website, which, in turn, presents the data to actual humans (e.g., via their networked computing devices) for feedback on what marketing message each sentence communicates, and that feedback is provided back to the system 500. Such marketing message feedback could be received and stored to constitute training data for the predictive models set forth herein.

In addition to (or as an alternative to) the machine-learning analysis example presented above, a rules-based analysis could be performed. For example, the system could maintain (i.e., store and/or access, such as via a networked client-server relationship) a dictionary of words identifying when particular discrete marketing messages, such as product features or product types, are being described. Particular words or phrases might identify when a product feature (e.g., relating to a carbonated beverage) is being described in the beverage industry. As such, a "sparkling beverage" product feature might be identified by comparing a parsed text block with a specialized beverage industry dictionary. An example rules-based version of systems 530, 532, 534, and/or 536 could include identifying word roots from the parsed text asset component 528.

Another example rules-based analysis of parsed communications could include syntax pattern-matching. For example, the method 500 could include one or more of systems 530, 532, 534, and/or 536 (*a*) identifying that a sentence begins with a verb (e.g., "contact us to learn more") in a second-person voice, and (b) matching that particular syntax with a "call to action" discrete marketing message. Other syntax pattern matches could also be used.

Yet another example rules-based analysis of parsed communications could include regular-expression pattern-matching. The method 500 could include identifying regular expressions that are specific to a particular industry. In the software industry, for example, the method 500 may include recognizing synonyms for "writing," "faster," and "software" in marketing messages as relating to coding software more quickly. This recognition of synonyms common in the software industry could take place regardless of the order in which the synonyms appear in the sentence, phrase, paragraph, or other parsed text block.

The above-mentioned rules-based analysis techniques may also help to produce training datasets. For example, a natural language processing rule could tag a parsed component as relating to a particular discrete marketing message. Tagging of parsed components could be performed by one or more humans or machine entities. In particular, in one example embodiment, the publicly available BART-MNLI model could be trained to tag parsed components as relating to particular discrete marketing messages. The BART-MNLI model and other "zero-shot" models may advantageously combine (a) context-specific understanding of the meaning of words provided through word embedding with (b) the simplicity and speed of rules-based systems.

The above-described examples primarily relate to text-based segmented components. Segmented components of types other than text (e.g., images, video, and/or audio) may similarly be analyzed to extract discrete marketing messages. For example, one method of analyzing images or video includes first determining, such as via machine learning, the contents of the images or videos (e.g., objects, concepts, emotions, people, demographics of the people, facial expressions, etc.). Second, rules-based methods, similar to those described above with respect to text-based assets, may be used to map the contents to discrete marketing messages. Other techniques may additionally or alternatively be used for content-determining and mapping.

According to example embodiments, discrete marketing messages fall within categories such as value propositions, statements of differentiation, product experiences, product features, brand archetypes, brand promise, brand vision, brand mission, brand positioning, brand values, brand reputation, brand archetypes, calls to action, audience demographics, audience pastimes, audience habitats, audience values, audience personality traits, audience lifestyles, and audience professions, among others. An example value proposition is for a beverage maker to claim that its water physically and mentally hydrates. An example statement of differentiation is that a particular brand of cola has a better cola taste than any other cola. An example of a product experience is for a beverage maker to claim an experience of having fun while enjoying a particular beverage, while hanging out with friends (more about what people are doing when drinking that particular beverage, than about the beverage itself). Product features can simply refer to or describe characteristics of a particular product. Other discrete marketing messages can communicate the personality (e.g., creative or rebellious) of the brand and the customers the brand is intended to serve, as well as the archetypes (e.g. "Rebel," "Sage," or "Lover") of the brand and the customers the brand is intended to serve.

FIG. 5 illustrates the one or more identified discrete marketing messages being passed from ML/NL/Rules systems 530, 532, 534, and/or 536 to block 540, in which at least one score is determined for each of the one or more discrete marketing messages determined in ML/NL/Rules systems 530, 532, 534 and/or 536. Once a collection of discrete marketing messages is identified, scores are calculated (or otherwise determined) to understand the relative emphasis of each marketing message. While block 540 is illustrated as a single block following the multiple system blocks 530, 532, 534, and/or 536, in some examples, the functionality of block 540 (calculating scores associated with discrete marketing messages) may be partially or entirely incorporated into one or more of the systems 530, 532, 534, and/or 536. Example scores include but are not limited to: a) counts of how many times a discrete marketing message is communicated in text, images, videos, and within the entire marketing asset, b) counts of how many times a discrete marketing message category (e.g., value proposition, brand archetype, audience habitat) was communicated in text, images, videos, and within the entire marketing asset, c) the percentage of all discrete marketing messages that an individual discrete marketing messages or category represents (count divided by the sum of all counts). The determined scores are then used as the independent variables within a trained predictive model for predicting a marketing outcome, as described below with respect to block 542. Moreover, scores may be used as training scores during the training of the trained predictive model, as described in further detail below.

The method 500 then includes inputting the determined scores into a trained predictive model to obtain a predicted marketing outcome, as shown in block 542. The scores (and possibly other data) associated with the discrete marketing messages are the independent variables and the marketing outcome data are the dependent variables. Training of the predictive model is described in further detail below, and generally with reference to FIGS. 3 and 4 and accompanying description. The predicted marketing outcome output by the trained predictive model relates to a result invoked by a particular marketing or sales communication. The marketing outcome could be a predicted engagement score, a web page bounce rate, a clickthrough rate, an occurrence of a sale, an occurrence of an engagement, or a specified conversion rate, for example. As other examples, for a website, a predicted marketing outcome could be users selecting a "click and buy" icon for a particular product. On a social media communication, a predicted marketing outcome could be to "like" or "share" a particular social media post. For a banner ad on a website, a predicted marketing outcome could be to click the banner ad to result in a site visit. Generally, a predicted marketing outcome could be any consumer or business action desired to be prompted based on marketing materials. In some examples, products (e.g., Coca-Cola) might not be purchased online; however, brand affection might still be predicted and gauged, such as via tracking "likes," "follows," or "shares" on social media.

The trained predictive model described with reference to block 542 is trained in advance of receiving the marketing asset (block 502), as part of a training process (see FIGS. 3 and 4 and accompanying description). Training of the predictive model may involve, for example, utilizing a training set having a multitude (perhaps millions or more) of scores (and possibly other data) associated with discrete marketing messages, along with corresponding known marketing outcome data. As another example, training of the predictive model may involve using a method having one or more blocks similar to blocks 502-540, which parse a multitude of marketing assets (having known marketing outcomes) into segmented components, for which a corresponding multitude of discrete marketing messages and associated scores are determined for use in training a predictive model. The scores (and possibly other data) associated with the discrete marketing messages are the independent variables and the marketing outcome data are the dependent variables. Similar to as described above with respect to block 542 for using a trained predictive model to predict a marketing outcome, the training marketing outcome could be an engagement score, a web page bounce rate, a clickthrough rate, an occurrence of a sale, an occurrence of an engagement, or a specified conversion rate associated with each of the discrete marketing messages (or assets) used for training, for example. As other examples, for a website, a training marketing outcome could be users selecting a "click and buy" icon for a particular product. On a social media communication, a training marketing outcome could be to "like" or "share" a particular social media post. For a banner ad on a website, a training marketing outcome could be to click the banner ad to result in a site visit. Other marketing outcomes could also be used for training.

In some examples, training a predictive model could optionally include determining a subset of the discrete marketing messages and/or associated scores that each have more than a threshold correlation to an associated marketing outcome. In other words, it is preferable but not required, that the predictive model training process involves determining which of the identified discrete messages from systems 530, 532, 534, and/or 536 are correlated with a marketing outcome. Some discrete marketing messages might have very little or no correlation with a marketing outcome, while other discrete marketing messages might have a high correlation with a marketing outcome. In some examples, determining correlation might involve combining one or more discrete marketing messages identified by systems 530, 532, 534, and/or 536. In other examples, all discrete marketing messages identified by systems 530, 532, 534, and/or 536 will be part of a determined subset, so that the subset does not constitute a reduced number of discrete marketing messages.

The correlation between discrete marketing messages and marketing outcomes can be determined based on data output by one or more predictive models (e.g., machine learning models) being used. Many such models provide correlation data, based on minimizing errors or other techniques. One example correlation measure is Pearson's Product-Moment coefficient (Pearson's r), which specifies a particular model's correlation to a data set as being between −1 and 1, where +1 is an exact positive correlation (positive slope) and −1 is an exact negative correlation (negative slope). Determining whether a discrete marketing message has more than a threshold correlation to an associated marketing outcome may include determining that Pearson's r coefficient for a particular model is greater than a particular value, such as an absolute value greater than +/−0.8, for example. Other correlation measures (e.g., least squares and others) and other threshold correlations may be used; the above are merely examples.

The method 500 uses discrete marketing messages, rather than raw data (e.g., word frequency, text vectorization (word embeddings), demographics, emotions on faces). Raw data has demonstrated to be too fragmented and cumbersome to be predictive. This is because raw data by itself has been found to produce too many predictive variables, require too much training data, and reduce the ability to infer causality from a predictive model. But when raw data is instead translated into discrete marketing messages, which might, for example, turn 100 independent variables into a single "discrete marketing message" independent variable, better prediction results have been realized. This corresponds to the feature-engineering layer of machine learning (see, e.g., feature vector(s) 322 in FIG. 3). Such features can be used in standard ML models, like Ridge regression and Lasso regression, for example. Regression models tend to work best in marketing and sales contexts because the predicted marketing outcome can take the form of a continuous number (e.g., from 0 to X) that the method 500 is trying to predict. This is in contrast to classification models, which simply attempt to provide yes/no predictions, such as whether an image portrays a cat. In some example embodiments, raw data can be used to help supplement a prediction supplied by the machine learning model that utilizes the predictive variable relying on the discrete marketing message.

The discrete marketing messages that are correlated with marketing outcomes are highly contextual. The components of the context could include, but are not limited to, the industry, the channel (email, web, social, etc.), the company characteristics, the marketing asset's objective (to sell, to inform, etc.), and the audience attributes. Therefore, in some embodiments, building an accurate predictive model includes training the model using marketing assets having a similar context. Similarly, trained models could be categorized and selected based on context, in order to improve prediction accuracy.

Returning to FIG. 5, after inputting the determined discrete messages and the determined associated scores into the trained predictive model, the predicted marketing outcome can be output 544, such as by displaying in a user interface (see, e.g., the screen shots of FIGS. 6A-6R, 7, and 8, illustrating output of a marketing outcome prediction) and/or printing in a printed output. Additionally or alternatively, the predicted marketing outcome can be stored 546 in a storage location (e.g., a snapshot of results published to a storage box location, such as those offered by box, google drive, or dropbox), provided as an input to a marketing automation platform, such as one offered by Hubspot, Marketo, Mailchimp, or Salesforce, providing as an input to a digital asset management (DAM) system, such as one offered by bynder or Brandfolder, providing as a user experience (UX) input to a creative process system, or providing in a report, for example. The output could be presented in a web-based Software-as-a-Service (SaaS) user interface, in one example. Such a SaaS user interface could serve as a web-based dashboard into which the predicted marketing outcome is pushed. For example, the output might include a report of predicted social media outcomes, a predicted number of consumer comments, a predicted number of consumer evaluations (e.g., "likes" or "loves"), and/or a predicted number of consumer "shares." In some embodiments, the output may include predictions along with recommendations that tell how to improve performance.

Figure 6A:
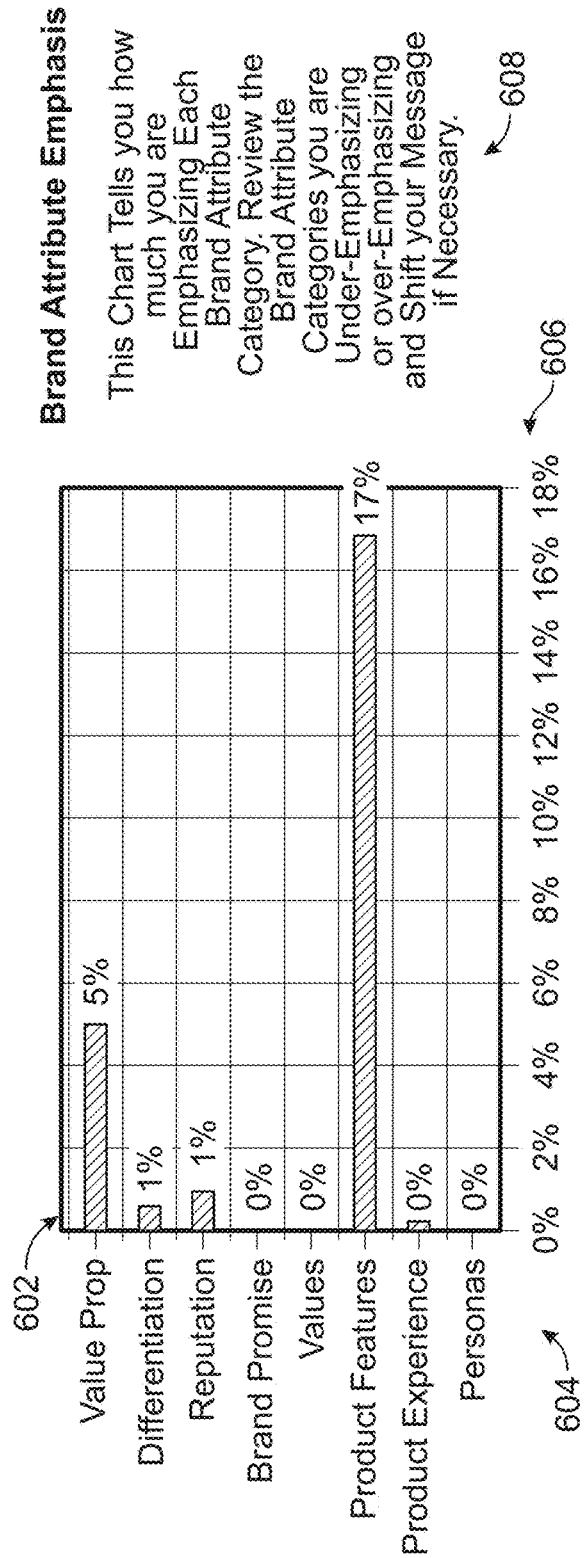
FIG. 6A is a pictorial screenshot diagram illustrating a graphical display of brand attributes, according to an example embodiment.
Figure 6B:
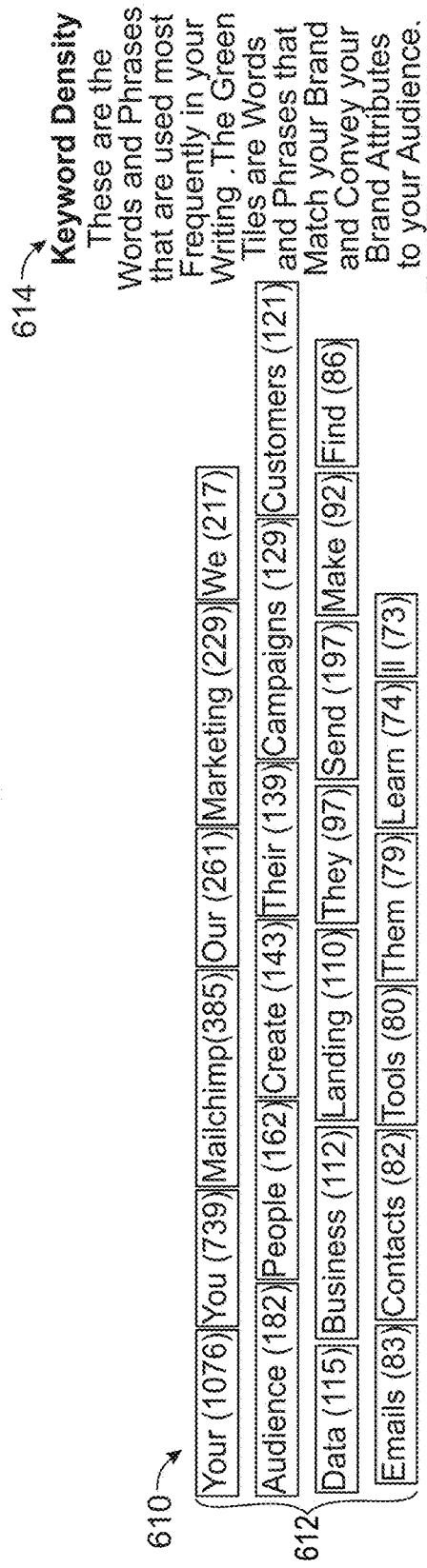
FIG. 6B is a pictorial screenshot diagram illustrating a tabular display of keyword density, according to an example embodiment.
Figure 6E:
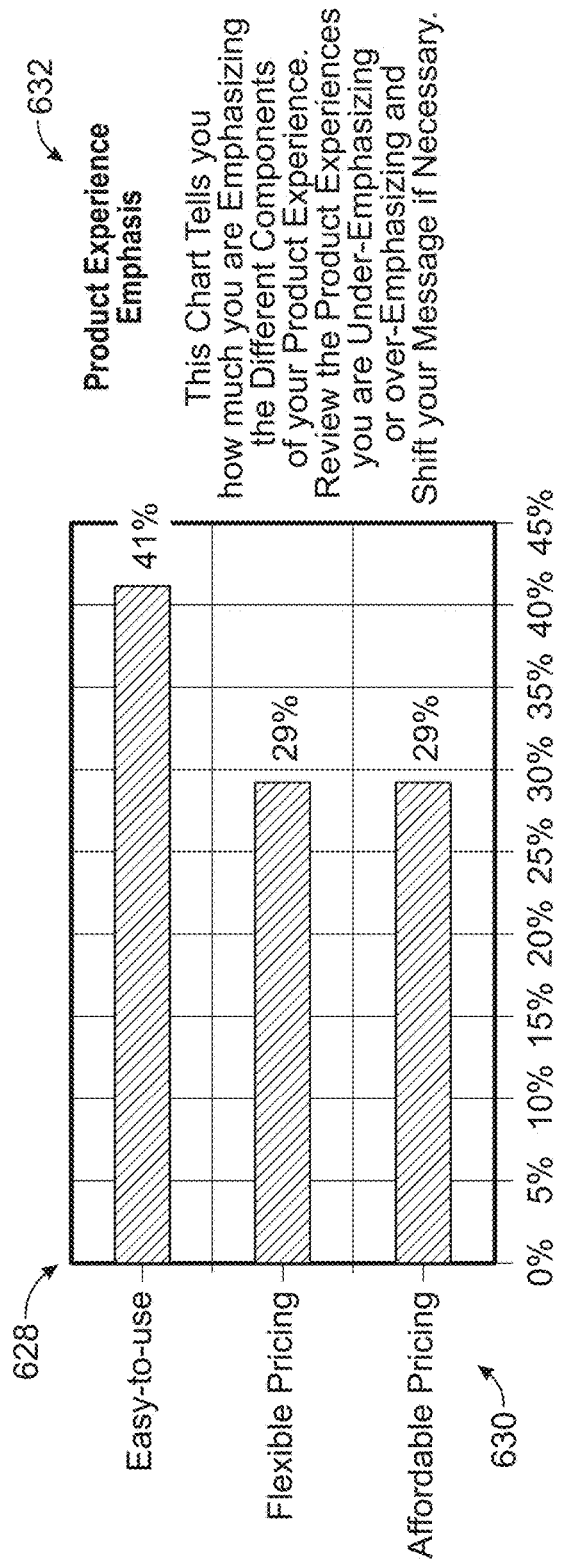
FIG. 6E is a pictorial screenshot diagram illustrating a graphical display of product experiences, according to an example embodiment.
Figure 6F:
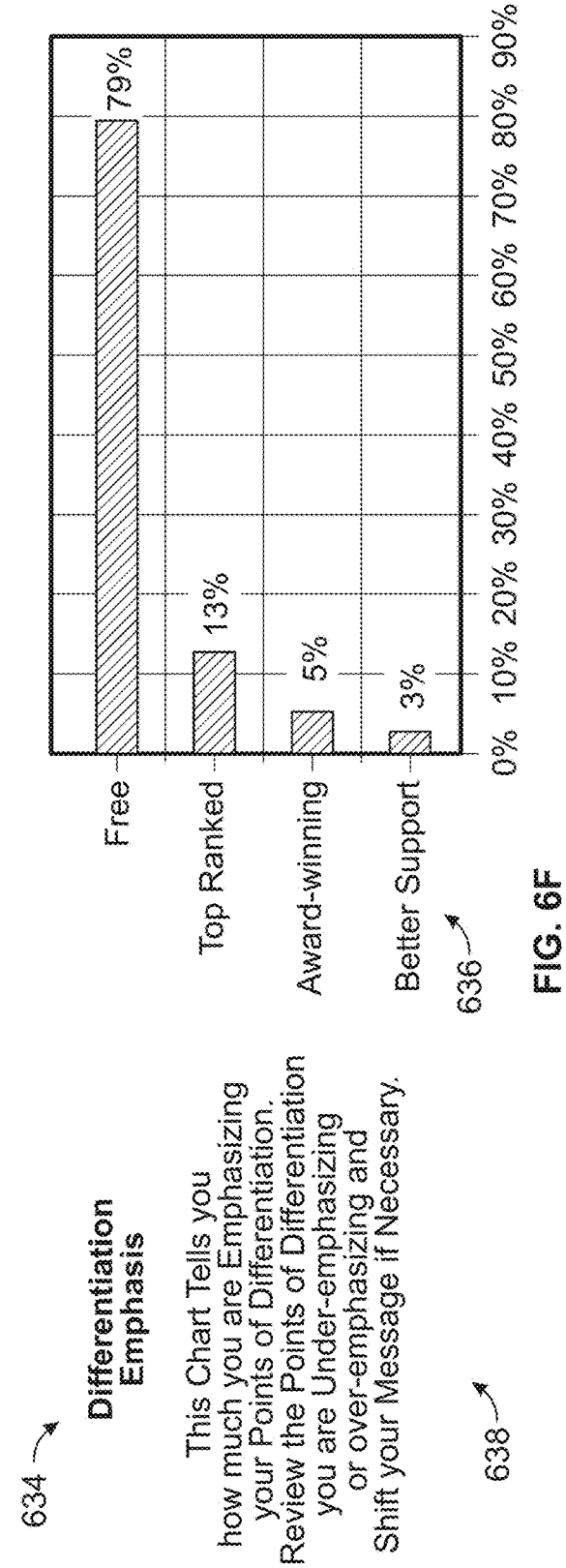
FIG. 6F is a pictorial screenshot diagram illustrating a graphical display of differentiations, according to an example embodiment.
Figure 6G:
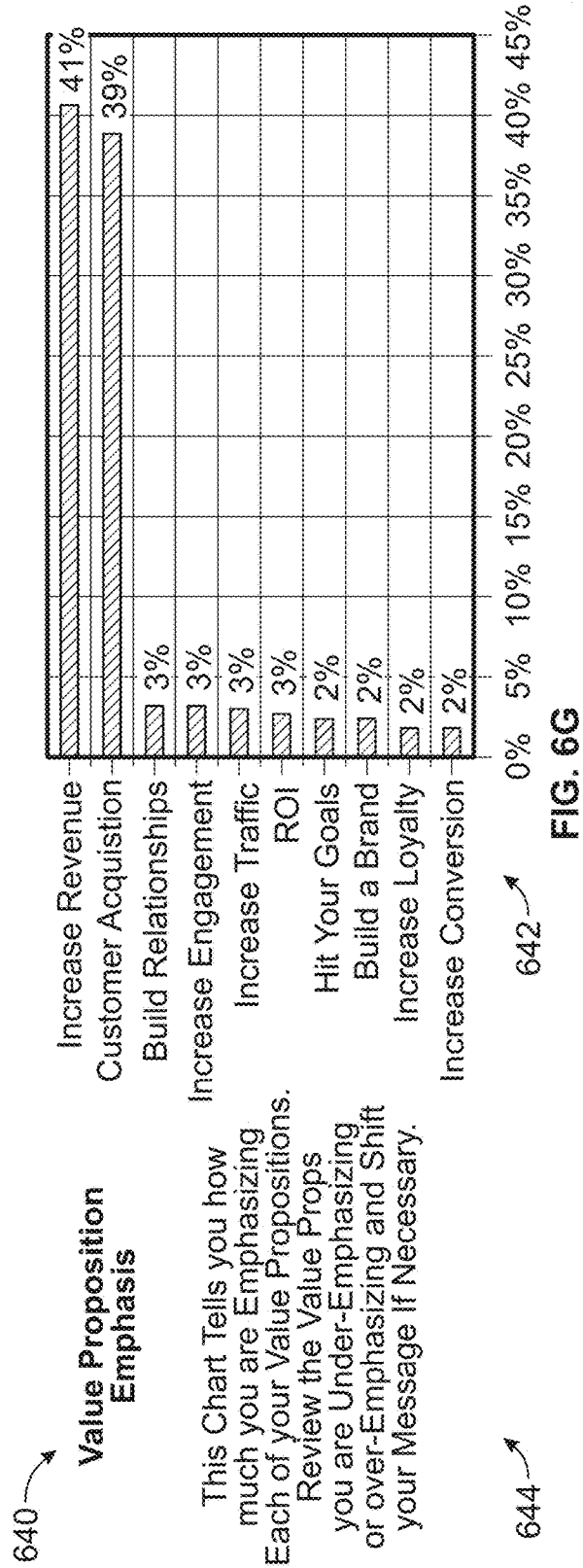
FIG. 6G is a pictorial screenshot diagram illustrating a graphical display of value propositions, according to an example embodiment.
Figure 6H:
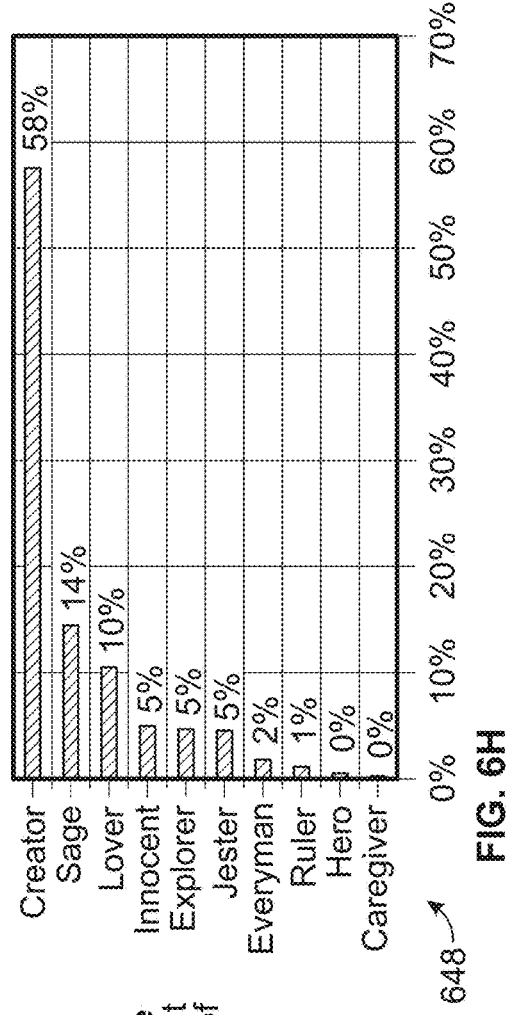
FIG. 6H is a pictorial screenshot diagram illustrating a graphical display of archetypes, according to an example embodiment.
Figure 6K:
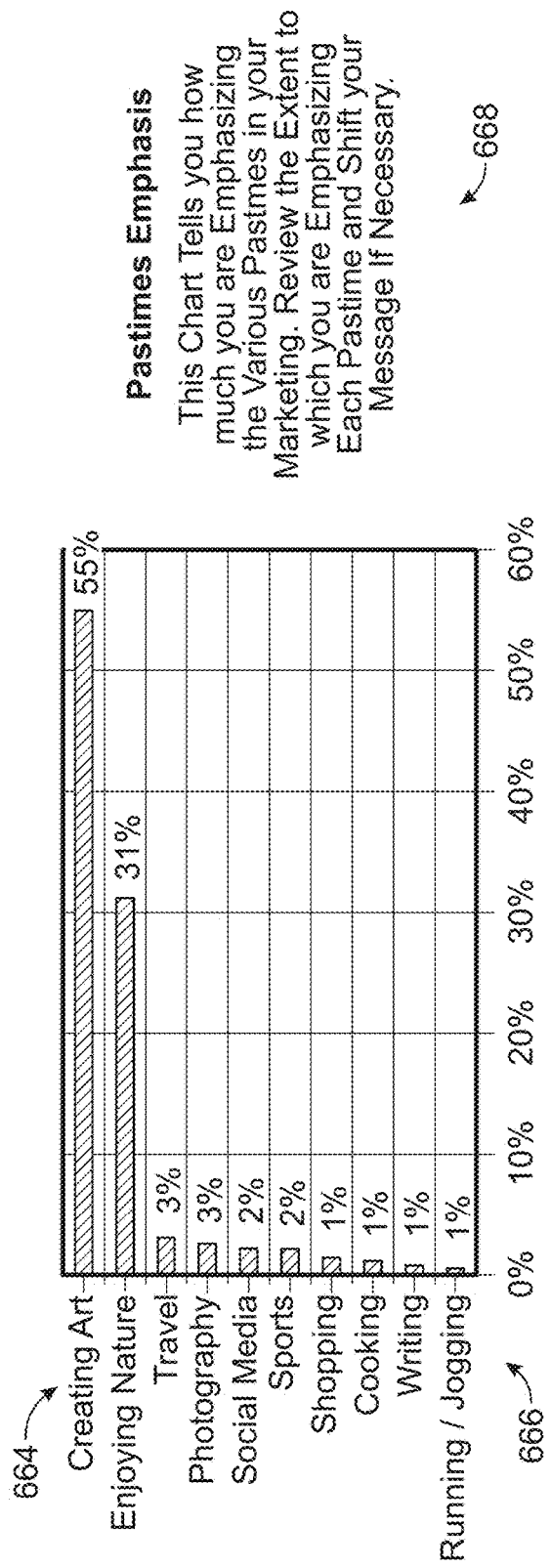
FIG. 6K is a pictorial screenshot diagram illustrating a graphical display of pastimes, according to an example embodiment.
Figure 6L:
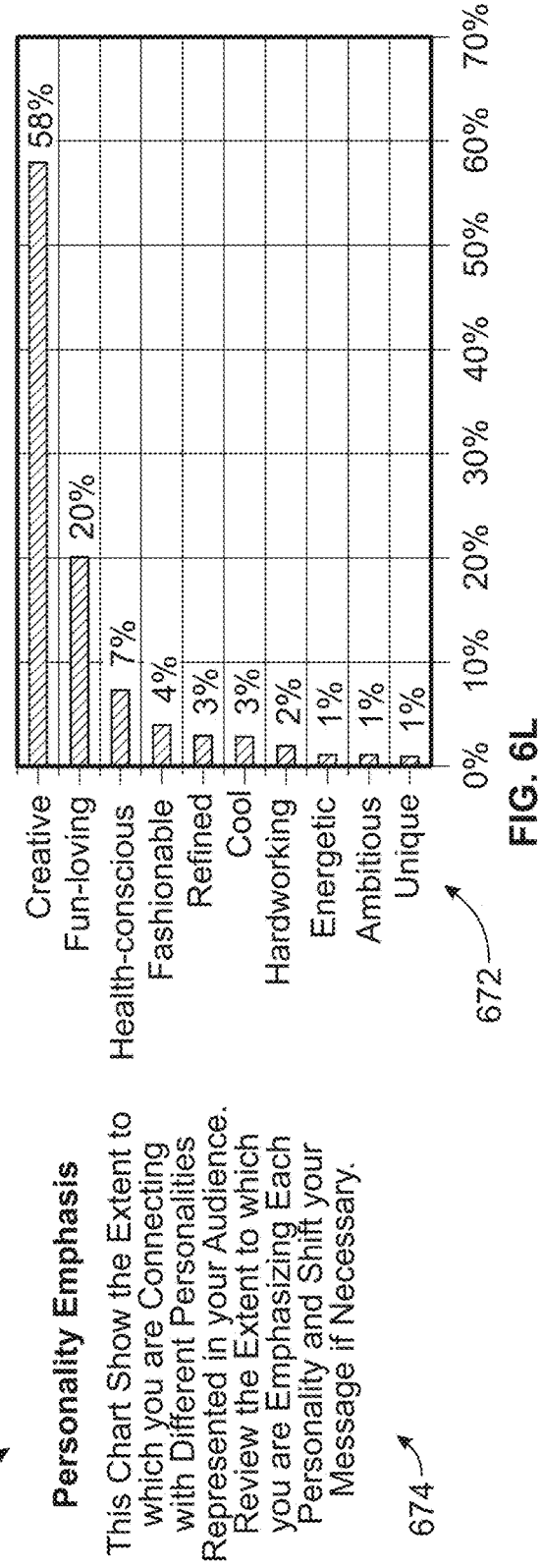
FIG. 6L is a pictorial screenshot diagram illustrating a graphical display of personalities, according to an example embodiment.
Figure 6M:
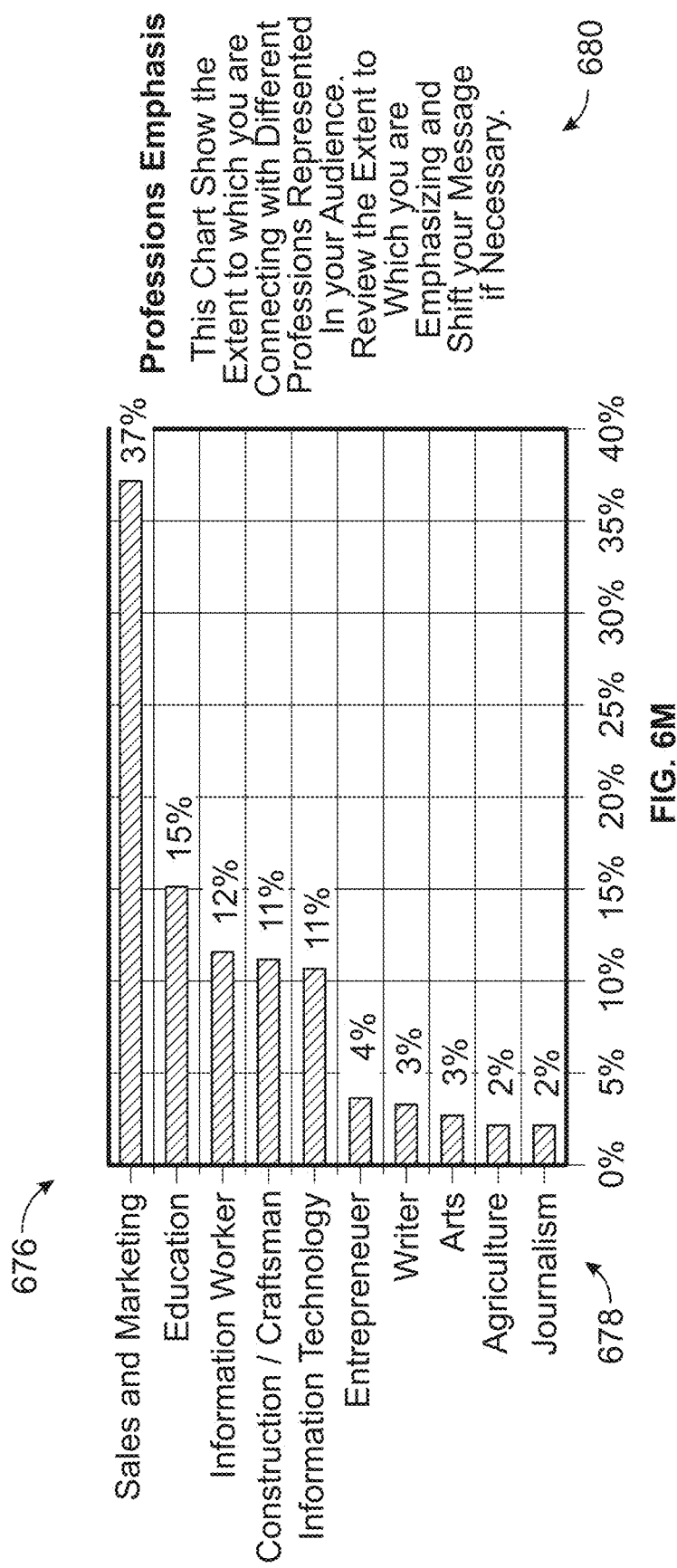
FIG. 6M is a pictorial screenshot diagram illustrating a competitive graphical display of professions, according to an example embodiment.
Figure 6N:
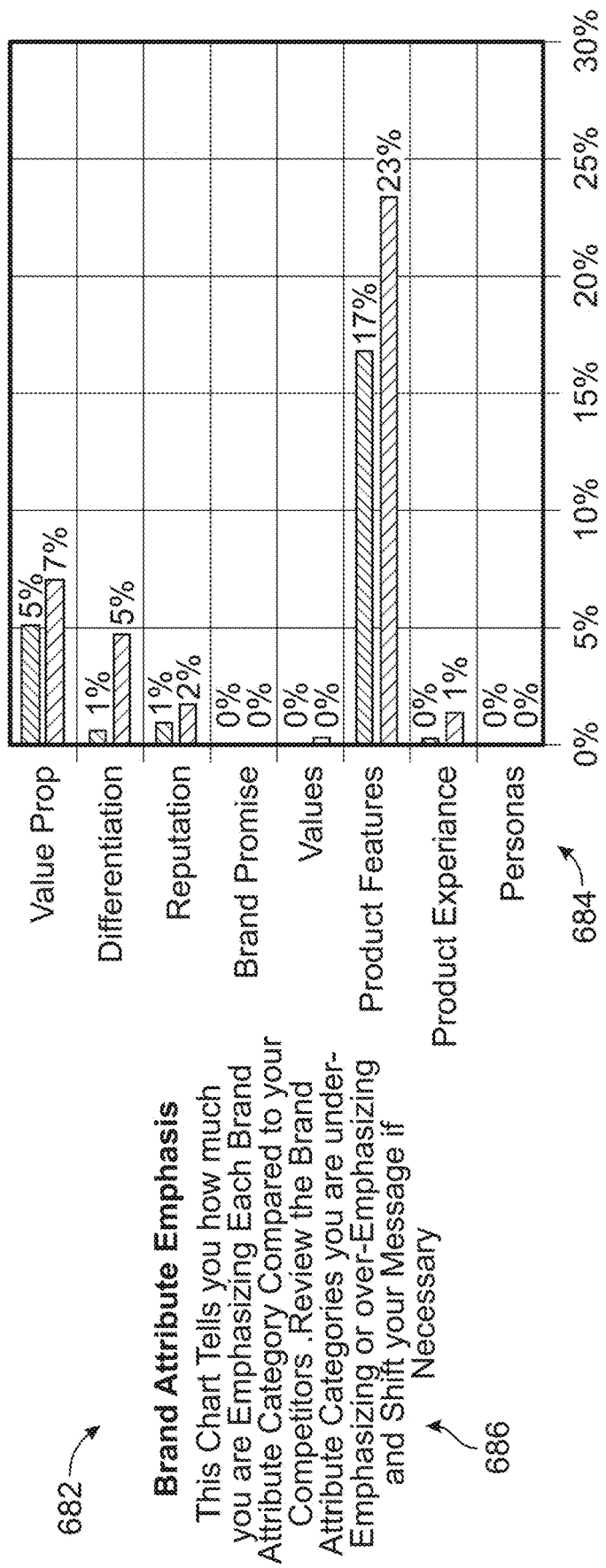
FIG. 6N is a pictorial screenshot diagram illustrating a competitive graphical display of brand attributes, according to an example embodiment.
Figure 6O:
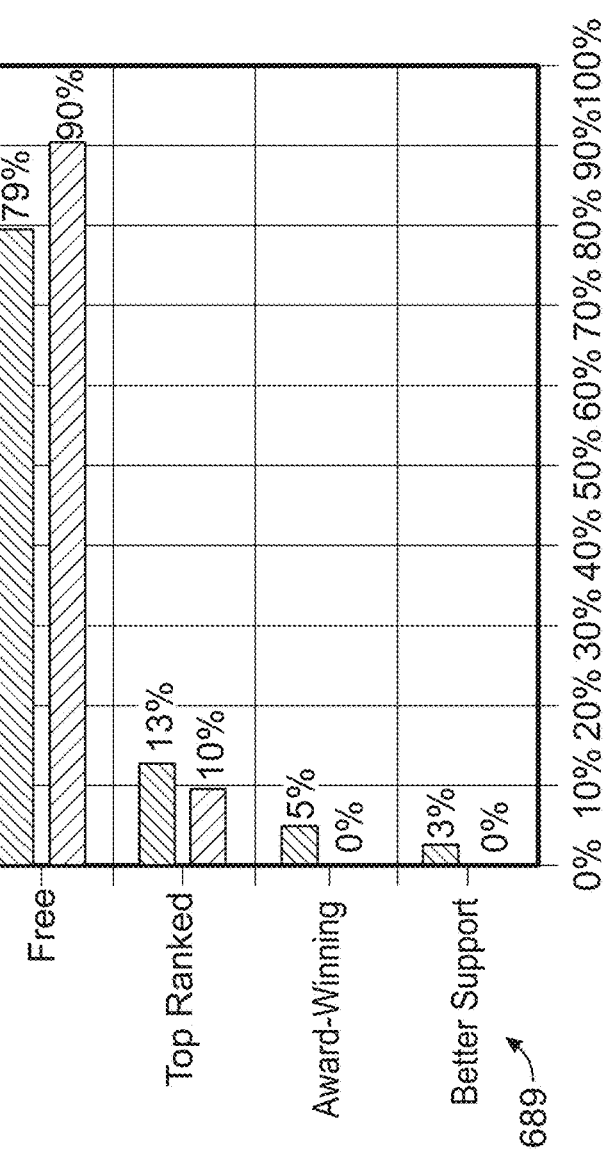
FIG. 6O is a pictorial screenshot diagram illustrating a competitive graphical display of differentiations, according to an example embodiment.
Figure 6P:
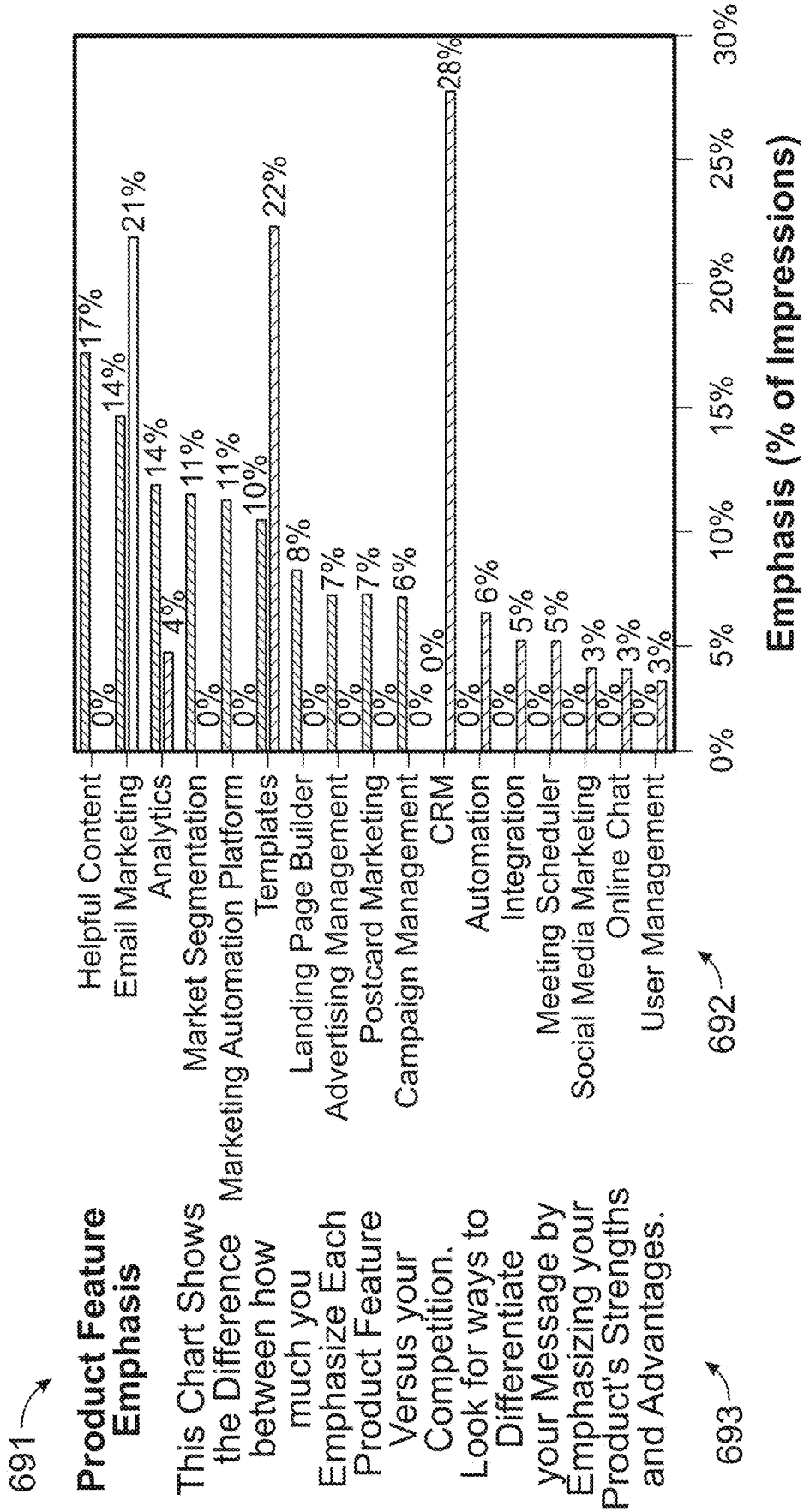
FIG. 6P is a pictorial screenshot diagram illustrating a competitive graphical display of product features, according to an example embodiment.
Figure 6Q:
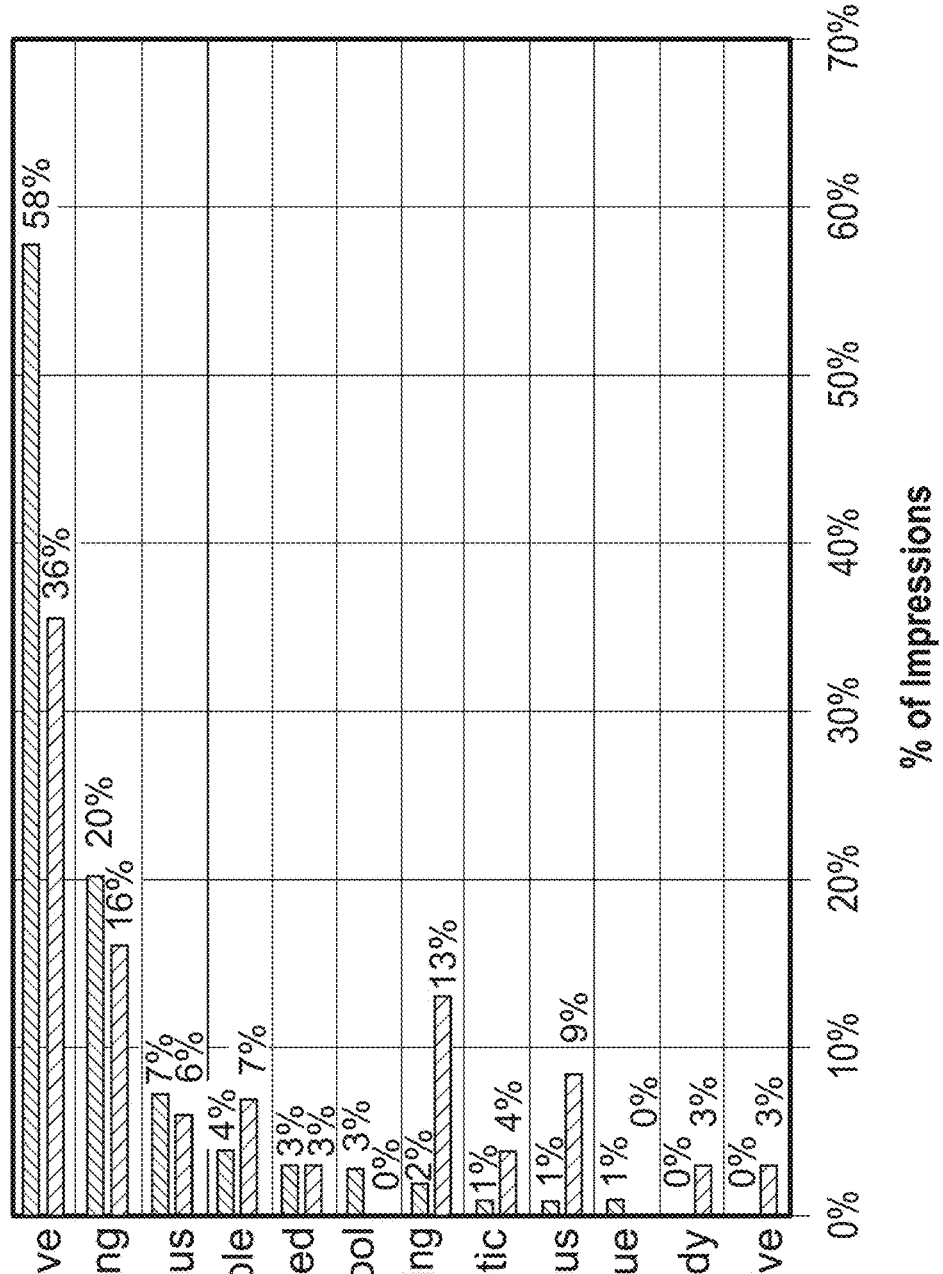
FIG. 6Q is a pictorial screenshot diagram illustrating a competitive graphical display of personalities, according to an example embodiment.
Figure 6R:
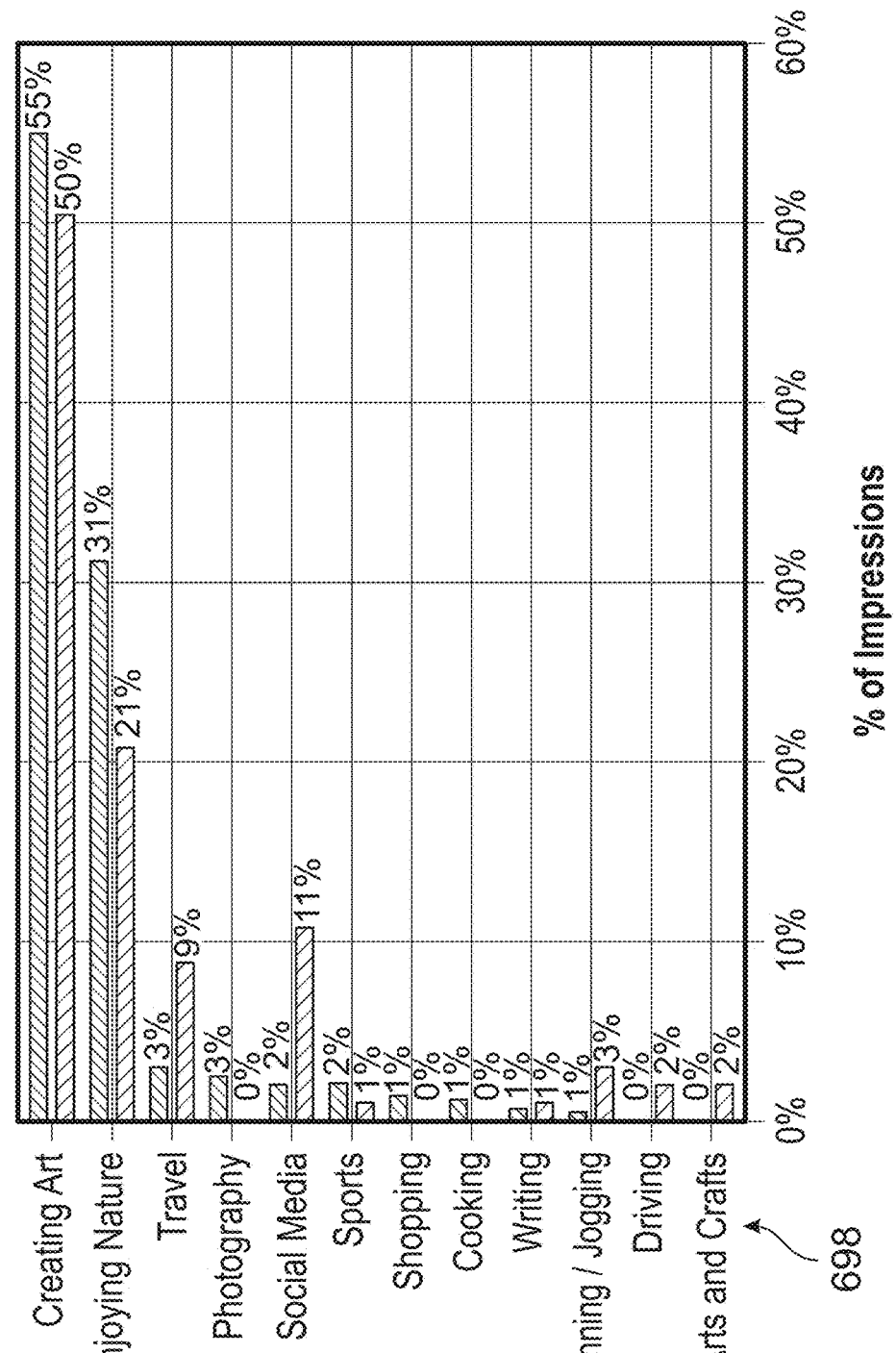
FIG. 6R is a pictorial screenshot diagram illustrating a competitive graphical display of pastimes, according to an example embodiment.

FIG. 6A-6R are pictorial diagrams illustrating example screenshot displays showing example correlated discrete marketing messages (predictive/independent variables) and associated scores for each of those correlated discrete marketing messages. Such scores (e.g., relative emphasis or density within a particular asset) may be used to train a predictive model, as was described above. These same scores may also be used by the trained predictive models to predict a marketing outcome, as was described above with respect to block 542 in FIG. 5. Each of FIGS. 6A-6R is briefly described below for the purpose of providing illustrative examples only; other industries, customers, products, etc., may have different types of discrete marketing messages and predicted marketing outcomes, according to example implementations. FIGS. 6A-6M show correlated discrete marketing messages for the asset being analyzed (or for a user having a suite of assets), while FIGS. 6N-6R show a comparative analysis between correlated discrete marketing messages of the user versus those of a competitor.

FIG. 6A illustrates a graphical display 602 of brand attributes 604 listed along a y-axis and relative emphasis 606 (in percentage) listed along an x-axis. As shown, the brand attributes 604 include value proposition, differentiation, reputation, brand promise, values, product features, product experience, and personas. Emphasis for each of these brand attributes ranges from 0% to 17%, with product features and value proposition being highest. A legend 608 provides information relating to brand attribute emphasis for a particular marketing asset being analyzed.

FIG. 6B illustrates a tabular display 610 of keyword density 612, with each keyword tab also including indicator of density. As shown, the keywords used most frequently in the asset being analyzed include "your" (1076), you (739), mailchimp (385), marketing (229), we (217), audience (182), and so on. A legend 615 provides information relating to keyword density, and explains a feature of highlighting one or more tabs as red or green (not shown in FIG. 6B) to signify keywords being brand matches or off-brand, respectively.

FIG. 6C illustrates a tabular display 616 of image objects and contents 618, with each image tab also including indicator of density. As shown, the images used most frequently in the asset being analyzed include no person (939), dark (663), nature (611), moon (587), bright (529), monochrome (475), eclipse (465), and so on. A legend 620 provides information relating to image contents, and explains a feature of highlighting one or more tabs as red or green (not shown in FIG. 6B) to signify images being brand matches or off-brand, respectively.

FIG. 6D illustrates a graphical display 622 of product features 624 listed along a y-axis and relative emphasis (in percentage) listed along an x-axis. As shown, the product features 624 include helpful content, email marketing, analytics, market segmentation, marketing automation platform, templates, landing page builder, advertising management, postcard marketing, and campaign management. Emphasis for each of these product features ranges from 6% to 17%, with helpful content and email marketing being highest. A legend 626 provides information relating to product feature emphasis for a particular marketing asset being analyzed.

FIG. 6E illustrates a graphical display 628 of product experience 630 listed along a y-axis and relative emphasis (in percentage) listed along an x-axis. As shown, the product experiences 630 include easy-to-use, flexible pricing, and affordable pricing. Emphasis for each of these product experiences ranges from 29% to 41%, with easy-to-use being highest. A legend 632 provides information relating to product experience emphasis for a particular marketing asset being analyzed.

FIG. 6F illustrates a graphical display 634 of differentiations 636 listed along a y-axis and relative emphasis (in percentage) listed along an x-axis. As shown, the differentiations 636 include free, top ranked, award-winning, and better support. Emphasis for each of these differentiations ranges from 3% to 79%, with free being highest. A legend 638 provides information relating to differentiation emphasis for a particular marketing asset being analyzed.

FIG. 6G illustrates a graphical display 640 of value propositions 642 listed along a y-axis and relative emphasis (in percentage) listed along an x-axis. As shown, the value propositions 642 include increase revenue, customer acquisition, build relationships, increase engagement, increase traffic, ROI, hit your goals, build a brand, increase loyalty, and increase conversion. Emphasis for each of these value propositions ranges from 2% to 41%, with increase revenue and customer acquisition being highest. A legend 644 provides information relating to value proposition emphasis for a particular marketing asset being analyzed.

FIG. 6H illustrates a graphical display 646 of archetypes 648 listed along a y-axis and relative emphasis (in percentage) listed along an x-axis. As shown, the archetypes 648 include creator, sage, lover, innocent, explorer, jester, everyman, ruler, hero, and caregiver. Emphasis for each of these archetypes ranges from 0% to 58%, with creator being highest. A legend 650 provides information relating to archetype emphasis for a particular marketing asset being analyzed.

FIG. 6I illustrates a graphical display 652 of reputations 654 listed along a y-axis and relative emphasis (in percentage) listed along an x-axis. As shown, the reputations 654 include simple, innovative, and trusted, ranging from 2% to 52%, with simple and innovative being highest. A legend 656 provides information relating to reputation emphasis for a particular marketing asset being analyzed.

FIG. 6J illustrates a graphical display 658 of habitats 658 listed along a y-axis and relative emphasis (in percentage) listed along an x-axis. As shown, the habitats 658 include a single "urban" habitat having an emphasis of 100%. A legend 662 provides information relating to habitat emphasis for a particular marketing asset being analyzed.

FIG. 6K illustrates a graphical display 664 of pastimes 666 listed along a y-axis and relative emphasis (in percentage) listed along an x-axis. As shown, the pastimes 666 include creating art, enjoying nature, travel, photography, social media, sports, shopping, cooking, writing, and running/jogging. Emphasis for each of these pastimes ranges from 1% to 55%, with creating art and enjoying nature being highest. A legend 668 provides information relating to pastimes emphasis for a particular marketing asset being analyzed.

FIG. 6L illustrates a graphical display 670 of personalities 672 listed along a y-axis and relative emphasis (in percentage) listed along an x-axis. As shown, the personalities 672 include creative, fun-loving, health-conscious, fashionable, refined, cool, hardworking, energetic, ambitious, and unique. Emphasis for each of these personalities ranges from 1% to 58%, with creative being highest. A legend 674 provides information relating to personalities emphasis for a particular marketing asset being analyzed.

FIG. 6M illustrates a graphical display 676 of professions 678 listed along a y-axis and relative emphasis (in percentage) listed along an x-axis. As shown, the professions 678 include sales and marketing, education, information worker, construction/craftsman, information technology, entrepreneur, writer, arts, agriculture, and journalism. Emphasis for each of these professions ranges from 1% to 58%, with creative being highest. A legend 680 provides information relating to professions emphasis for a particular marketing asset being analyzed.

FIG. 6N illustrates a graphical display 682 of brand attributes 684 listed along a y-axis and relative emphasis (in percentage) listed along an x-axis. As shown, brand attributes are listed for both a particular asset or user and for a competitor, such as a competitor pre-specified by the user for comparison. The brand attributes 684 shown include value proposition, differentiation, reputation, brand promise, values, product features, product experience, and personas. The highest emphasis for both the user and competitor is on product features, with the competitor placing a slightly higher emphasis (23%) compared to the user (17%). A legend 686 provides information relating to brand attribute emphasis compared to competitors.

FIG. 6O illustrates a graphical display 688 of differentiations 689 listed along a y-axis and relative emphasis (in percentage) listed along an x-axis. As shown, differentiations 689 are listed for both a particular asset or user and for a competitor, such as a competitor pre-specified by the user for comparison. The differentiations 689 shown include free, top ranked, award-winning, and better support. The highest emphasis for both the user and competitor is free, with the competitor placing a higher emphasis (90%) compared to the user (79%), while the user places a higher emphasis (13%) on top ranked compared to the competitor (10%). A legend 690 provides information relating to differentiations emphasis compared to competitors.

FIG. 6P illustrates a graphical display 688 of product features 692 listed along a y-axis and relative emphasis (in percentage) listed along an x-axis. As shown, product features 692 are listed for both a particular asset or user and for a competitor, such as a competitor pre-specified by the user for comparison. The product features 692 shown include helpful content, email marketing, analytics, market segmentation, marketing automation platform, templates, landing page builder, advertising management, postcard marketing, campaign management, CRM, automation integrations, meeting scheduler, social media marketing, online chat, and user management. The highest emphasis for the competitor is placed on CRM, templates, and email marketing, while the highest emphasis for the user is placed on helpful content and email marketing. A legend 693 provides information relating to product feature emphasis compared to competitors.

FIG. 6Q illustrates a graphical display 694 of personalities 695 listed along a y-axis and relative emphasis (in percentage) listed along an x-axis. As shown, personalities 695 are listed for both a particular asset or user and for a competitor, such as a competitor pre-specified by the user for comparison. The personalities 695 shown include creative, fun-loving, health-conscious, fashionable, refined, cool, hardworking, energetic, ambitious, unique, trendy, and progressive. The highest emphasis for both the user and the competitor is placed on creative (58% and 36%). A legend 696 provides information relating to personality emphasis compared to competitors.

FIG. 6R illustrates a graphical display 697 of pastimes 698 listed along a y-axis and relative emphasis (in percentage) listed along an x-axis. As shown, pastimes 698 are listed for both a particular asset or user and for a competitor, such as a competitor pre-specified by the user for comparison. The pastimes 698 shown include creating art, enjoying nature, travel, photography, social media, sports, shopping, cooking, writing, running/jogging, driving, and arts and crafts. The highest emphasis for both the user and the competitor is placed on creating art (55% and 50%), followed by enjoying nature (31% and 21%). A legend 690 provides information relating to pastimes emphasis compared to competitors.

Figure 7:
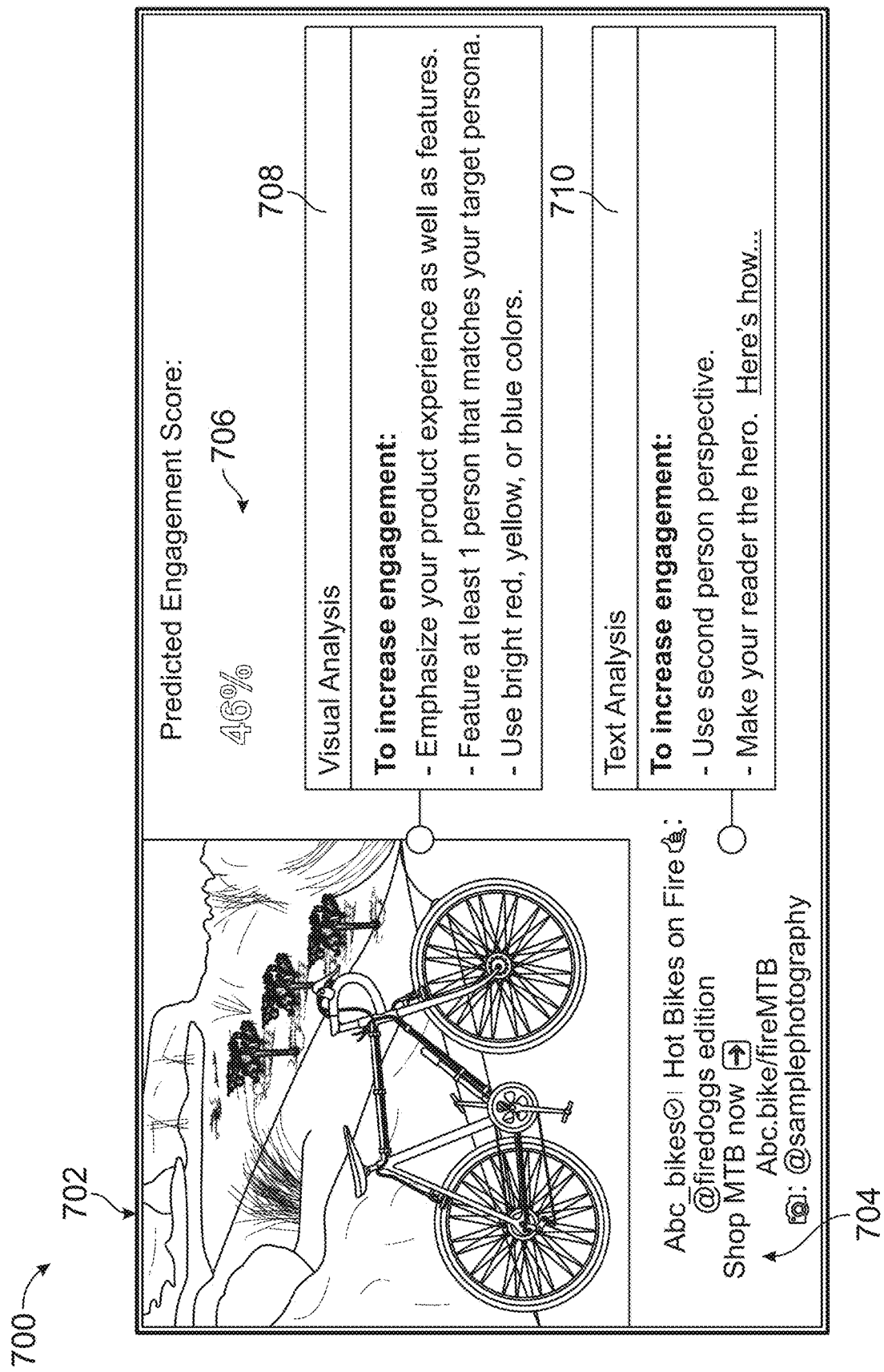
FIG. 7 is a pictorial screenshot diagram illustrating output of a marketing outcome prediction, according to an example embodiment.

FIG. 7 is a pictorial screenshot diagram illustrating example output 700 of an example marketing outcome prediction. The output 700 includes the asset/communication being analyzed—in this case, an image 702 of a mountain bike and corresponding text 704 relating to the image 702. The output also includes a predicted marketing outcome 706—in this case a predicted engagement score of 46%. Finally, the illustrated example includes tips 708 and 710 on how to increase visual and textual engagement.

Figure 8:
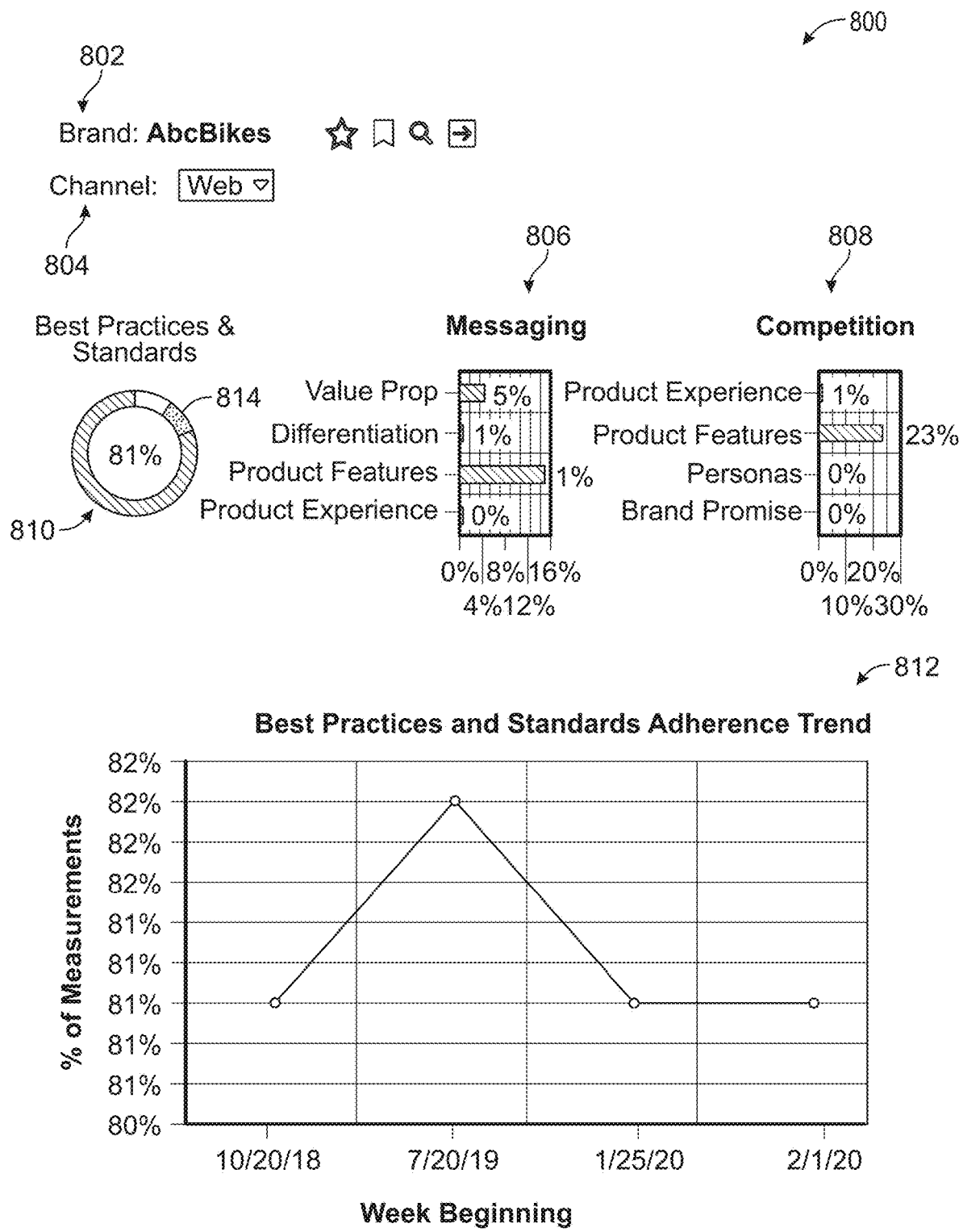
FIG. 8 is a pictorial screenshot diagram illustrating an example user interface in the form of a dashboard report, according to an example embodiment.

FIG. 8 is a pictorial screenshot diagram illustrating an example user interface 800 in the form of a dashboard report providing example marketing-outcome prediction information. The user interface 800 can provide outputs including a brand identification 802, channel 804, a graphical plot 806 of messaging emphasis for the specific brand and channel, a graphical plot 808 of competitor messaging emphasis, a chart 810 graphically illustrating a best practices and standards score (81%) in this example, and a plot 812 showing a best practices and standards adherence trend over time. In the plot 812, in three out of four time periods, the best practices and standards adherence score was 81%. In one of the four time periods, the score was 82%, a difference of 1%. That difference is illustrated in chart 810 as segment 814, signifying a portion decreased (if in red) or increased (if in green) from a previous time period's score. The metrics and analytics illustrated in FIG. 8 are merely examples, and many other or additional metrics, analytics, and other dashboards may be included or substituted. For example, the information illustrated in FIGS. 6A-6R may be included in the user interface 800. The user interface 800 may also receive user inputs, such as to select or modify which information is displayed.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting a marketing outcome for a marketing asset, comprising:
   determining by a computing device, for a marketing asset received by the computing device, at least one asset type of the marketing asset;
   classifying, by a classification model executing on the computing device, the marketing asset to assign a classification attribute to the marketing asset;
   parsing, by the computing device, the marketing asset into a plurality of segmented components, based on the at least one asset type, wherein the parsing includes at least one of (a) crawling a web site to identify at least one html tag, (b) using an Application Program Interface (API) for a social media app associated with a social media post, (c) using a pdf parser, or (d) using an API for a web-based word-processing application, and wherein the plurality of segmented components comprises at least one of the following: text, image, audio, or video, and at least one of the segmented components comprises an image segmented component;
   for each segmented component of at least a subset of the plurality of segmented components:
      selecting, from a plurality of machine learning models, a first predictive machine learning model corresponding to the segmented component of the plurality of segmented components to obtain a selected predicted machine learning model, determining, for the segmented component, at least one discrete marketing message by the selected predictive machine learning model using the segmented component, dividing the image segmented component into a plurality of sections, providing each of the plurality of sections to an image predictive model from the plurality of machine learning models to generate a plurality of outputs, combining the plurality of outputs into an aggregate prediction, and determining, for the image segmented component, an additional discrete marketing message by the selected predictive machine learning model;

determining, for each of the at least one discrete marketing message and the additional discrete marketing message, at least one associated score indicating a relative emphasis of that discrete marketing message relative to other discrete marketing messages in the at least one discrete marketing message;

obtaining, by a trained predictive model using the at least one associated score as an independent variable as input, a predicted marketing outcome, wherein the trained predictive model was trained using training scores associated with a multitude of training discrete marketing messages as independent variables and corresponding training marketing outcome data as dependent variables; and providing a recommendation associated with the predicted marketing outcome, wherein the recommendation includes at least one recommended alteration to the text, image, audio, or video in the marketing asset to improve a likelihood of achieving a desired marketing outcome.

2. The method of claim 1, further comprising selecting, based on the classification attribute assigned to the marketing asset, the trained predictive model from among a plurality of trained predictive models that are categorized based on context.

3. The method of claim 1, wherein the at least one associated score is based on at least one of the following: (a) how many times a particular discrete marketing message is communicated in the marketing asset or (b) where, in the marketing asset, the particular discrete marketing message is located.

4. The method of claim 1, wherein, if one of the plurality of segmented components comprises audio, the method further comprises transcribing the audio into text.

5. The method of claim 1, wherein, if one of the plurality of segmented components comprises a video component, the method further comprises:
splitting the video component into a plurality of image components and an audio component; and
transcribing the audio component.

6. The method of claim 1, wherein the at least one html tag identifies at least one of an image, headline text, sub-headline text, paragraph text, video, or other component.

7. The method of claim 1, wherein the classification attribute assigned to the marketing asset comprises at least one of a marketing objective or an intended outcome.

8. The method of claim 1, wherein the classification attribute assigned to the marketing asset comprises at least one of a business vertical, a brand archetype, a customer type, or a supply chain role.

9. The method of claim 1, wherein the classification attribute is provided by at least one of (a) a creator of the marketing asset or (b) a user of the computing device.

10. The method of claim 1, wherein the computing device assigns the classification attribute to the marketing asset by applying the classification model to the marketing asset.

11. The method of claim 1, wherein parsing the marketing asset into the plurality of segmented components comprises, if the marketing asset includes a plain-text email, parsing a text block in the plain-text email.

12. The method of claim 1, wherein parsing the marketing asset into the plurality of segmented components comprises, if the marketing asset includes an html email, identifying at least one html tag in the html email, wherein the at least one html tag identifies at least one of an image, headline text, sub-headline text, paragraph text, video, or other component.

13. The method of claim 1, wherein parsing the marketing asset into the plurality of segmented components comprises, if the marketing asset includes a video:
segmenting the video into temporal blocks;
parsing each temporal block into audio and images; and
transcribing the audio for each temporal block into text, wherein the transcribing includes using an audio transcription service.

14. The method of claim 1, wherein parsing the marketing asset into the plurality of segmented components comprises, if the marketing asset includes an audio sales call:
segmenting the audio sales call into temporal blocks each having audio; and
transcribing the audio for each temporal block into text, wherein the transcribing includes using an audio transcription service.

15. The method of claim 1, wherein determining the at least one discrete marketing message comprises applying natural-language rules to the segmented component of the marketing asset to determine at least one of a word root or syntax pattern.

16. The method of claim 1, wherein the at least one discrete marketing message is from a discrete marketing message category selected from the following: value propositions, statements of differentiation, product experiences, product features, brand archetypes, brand promises, brand visions, brand missions, brand positionings, brand purposes, brand values, brand reputations, calls to action, audience demographics, audience pastimes, audience habitats, audience values, audience personality traits, audience lifestyles, or audience professions.

17. The method of claim 1, wherein determining the at least one discrete marketing message comprises accessing at least one industry-specific dictionary for the segmented component of the marketing asset.

18. The method of claim 1, wherein the predicted marketing outcome is selected from the group consisting of a predicted engagement score, a web page bounce rate, a clickthrough rate, an occurrence of a sale, an occurrence of an engagement, or a specified conversion rate.

19. The method of claim 1, further comprising:
determining a subset of discrete marketing messages, wherein the subset comprises only those determined discrete marketing messages having more than a threshold correlation to an associated marketing outcome; and
providing a recommendation associated with the predicted marketing outcome, wherein the recommendation relates to the subset of discrete marketing messages.

20. A system for predicting a marketing outcome for a marketing asset, comprising:
- at least one computing device to perform tasks comprising:
  - determining, for a marketing asset, at least one asset type of the marketing asset;
  - parsing the marketing asset into a plurality of segmented components, based on the at least one asset type, wherein at least one of the segmented components comprises an image segmented component;
  - for each segmented component of at least a subset of the plurality of segmented components:
    - selecting, from a plurality of machine learning models, a first predictive machine learning model corresponding to the segmented component of the plurality of segmented components to obtain a selected predicted machine learning model,
    - determining, for the segmented component and by the selected predictive machine learning model using the segmented component, at least one discrete marketing message conveyed by the marketing asset,
    - dividing the image segmented component into a plurality of sections,
    - providing each of the plurality of sections to an image predictive model from the plurality of machine learning models to generate a plurality of outputs,
    - combining the plurality of outputs into an aggregate prediction, and
    - determining, for the image segmented component, an additional discrete marketing message by the selected predictive machine learning model;
  - determining, for each of the at least one discrete marketing message and the additional discrete marketing message, at least one associated score indicating a relative emphasis of that discrete marketing message relative to other discrete marketing messages in the at least one discrete marketing message;
  - obtaining, by a trained predictive model using the at least one associated score as an independent variable as input, a predicted marketing outcome, wherein the trained predictive model was trained using training scores associated with a multitude of training discrete marketing messages as independent variables and corresponding training marketing outcome data as dependent variables; and
  - providing a recommendation associated with the predicted marketing outcome, wherein the recommendation includes at least one recommended alteration to text, image, audio, or video in the marketing asset to improve a likelihood of achieving a desired marketing outcome.

21. The system of claim 20, wherein the tasks performed by the at least one computing device further comprise providing via a graphical interface, an output related to the predicted marketing outcome.

22. The system of claim 20, wherein the at least one associated score is based on at least one of the following: (a) how many times a particular discrete marketing message is communicated in the marketing asset or (b) where, in the marketing asset, the particular discrete marketing message is located.

23. The system of claim 20, wherein the plurality of segmented components comprises at least one of the following: text, image, audio, or video.

24. An article of manufacture including a non-transitory computer readable medium, having stored thereon program instructions that, upon execution by one or more processors, cause the one or more processors to perform tasks comprising:
- determining, for a marketing asset, at least one asset type of the marketing asset;
- parsing the marketing asset into a plurality of segmented components, based on the at least one asset type, wherein at least one of the segmented components comprises an image segmented component;
- for each segmented component of at least a subset of the plurality of segmented components:
  - selecting, from a plurality of machine learning models, a first predictive machine learning model corresponding to the segmented component of the plurality of segmented components to obtain a selected predicted machine learning model,
  - determining, for the segmented component and by the selected predictive machine learning model using the segmented component, at least one discrete marketing message conveyed by the marketing asset,
  - dividing the image segmented component into a plurality of sections,
  - providing each of the plurality of sections to an image predictive model from the plurality of machine learning models to generate a plurality of outputs;
  - combining the plurality of outputs into an aggregate prediction, and
  - determining, for the image segmented component, an additional discrete marketing message by the selected predictive machine learning model;
- determining, for each of the at least one discrete marketing message and the additional discrete marketing message, at least one associated score indicating a relative emphasis of that discrete marketing message relative to other discrete marketing messages in the at least one discrete marketing message;
- obtaining, by a trained predictive model using the at least one associated score as an independent variable as input, a predicted marketing outcome, wherein the trained predictive model was trained using training scores associated with a multitude of training discrete marketing messages as independent variables and corresponding training marketing outcome data as dependent variables; and
- providing a recommendation associated with the predicted marketing outcome, wherein the recommendation includes at least one recommended alteration to text, image, audio, or video in the marketing asset to improve a likelihood of achieving a desired marketing outcome.

25. The article of manufacture of claim 24, wherein the at least one associated score is based on at least one of the following: (a) how many times a particular discrete marketing message is communicated in the marketing asset or (b) where, in the marketing asset, the particular discrete marketing message is located.

26. The article of manufacture of claim 24, wherein the plurality of segmented components comprises at least one of the following: text, image, audio, or video.

27. The article of manufacture of claim 24, wherein parsing includes at least one of (a) crawling a web site to identify at least one html tag, (b) using an Application Program Interface (API) for a social media app associated with a social media post, (c) using a pdf parser, or (d) using an API for a web-based word-processing application, and wherein the plurality of segmented components comprises at least one of the following: text, image, audio, or video.

28. The article of manufacture of claim 24, wherein parsing includes at least one of:
- (a) if the marketing asset includes a plain-text email, parsing a text block in the plain-text email;
- (b) if the marketing asset includes an html email, identifying at least one html tag in the html email, wherein the at least one html tag identifies at least one of an image, headline text, sub-headline text, paragraph text, video, or other component;
- (c) if the marketing asset includes a video:
  - (i) segmenting the video into temporal blocks;
  - (ii) parsing each temporal block into audio and images; and
  - (iii) transcribing the audio for each temporal block into text; or
- (d) if the marketing asset includes an audio sales call:
  - (i) segmenting the audio sales call into temporal blocks each having audio; and
  - (ii) transcribing the audio for each temporal block into text.

\* \* \* \* \*